United States Patent [19]
Landt et al.

[11] Patent Number: 6,078,251
[45] Date of Patent: *Jun. 20, 2000

[54] INTEGRATED MULTI-METER AND WIRELESS COMMUNICATION LINK

[75] Inventors: Jeremy A. Landt, Santa Fe, N. Mex.; Ivan Berka, Toronto, Canada; Curt L. Carrender, Placeitas, N. Mex.; G. Russell Mortenson, Plano, Tex.; Vickram Sondhi, Oakville, Canada; Donald F. Speirs, Fairview, N. Mex.

[73] Assignee: Intermec IP Corporation, Woodland Hills, Calif.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/826,449

[22] Filed: Mar. 27, 1997

Related U.S. Application Data

[63] Continuation-in-part of application No. 08/727,796, Oct. 7, 1996, abandoned, which is a continuation-in-part of application No. 08/623,327, Mar. 27, 1996, Pat. No. 5,850,187.

[51] Int. Cl.[7] .................................................. H04Q 1/00
[52] U.S. Cl. .................................. 340/10.41; 340/572.1; 340/870.02
[58] Field of Search ..................... 340/825.54, 870.02, 340/572.1, 10.41, 10.4

[56] References Cited

U.S. PATENT DOCUMENTS

| | | |
|---|---|---|
| 3,984,835 | 10/1976 | Kaplan et al. . |
| 4,242,663 | 12/1980 | Slobodin . |
| 4,288,689 | 9/1981 | Lemelson et al. . |
| 4,636,950 | 1/1987 | Caswell et al. . |
| 4,656,463 | 4/1987 | Anders et al. . |
| 4,688,026 | 8/1987 | Scribner et al. . |
| 4,786,907 | 11/1988 | Koelle . |
| 4,912,471 | 3/1990 | Tyburski et al. . |
| 5,008,661 | 4/1991 | Raj . |
| 5,030,807 | 7/1991 | Landt et al. . |
| 5,051,741 | 9/1991 | Wesby . |
| 5,053,774 | 10/1991 | Scheurmann et al. . |
| 5,194,860 | 3/1993 | Jones et al. .............................. 340/870 |
| 5,216,233 | 6/1993 | Main et al. . |
| 5,298,894 | 3/1994 | Cerny et al. ............................ 340/870 |
| 5,305,008 | 4/1994 | Turner et al. . |
| 5,339,339 | 8/1994 | Petitclerc et al. . |
| 5,382,784 | 1/1995 | Eberhardt . |
| 5,450,087 | 9/1995 | Hurta et al. . |
| 5,450,088 | 9/1995 | Meier et al. . |
| 5,455,575 | 10/1995 | Scheurmann . |
| 5,539,775 | 7/1996 | Tuttle et al. . |
| 5,617,084 | 4/1997 | Sears ....................................... 340/870 |
| 5,640,002 | 6/1997 | Ruppert et al. ......................... 235/472 |
| 5,659,303 | 8/1997 | Adair, Jr. ................................ 340/870 |
| 5,850,187 | 12/1998 | Carrender ........................... 340/825.54 |

*Primary Examiner*—Brian Zimmerman
*Attorney, Agent, or Firm*—Fish & Richardson P.C.

[57] ABSTRACT

An apparatus for object identification including a multi-meter terminal having a plurality of data modules, a triggering device for initiating one of the plurality of data modules to retrieve object identification data from an object, a radio module for downloading the retrieved object identification data to a host and a housing containing the data modules, triggering device and the radio module.

50 Claims, 19 Drawing Sheets

6,078,251

INTEGRATED MULTI-METER AND WIRELESS COMMUNICATION LINK

This is a continuation-in-part of U.S. application Ser. No. 08/727,796, entitled "INTEGRATED MULTI-METER AND WIRELESS COMMUNICATION LINK", filed on Oct. 7, 1996 now abandoned, which is a continuation-in-part of U.S. application Ser. No. 08/623,327, entitled "INTEGRATED ELECTRONIC TAG READER AND WIRELESS COMMUNICATION LINK", filed on Mar. 27, 1996 now U.S. Pat. No. 5,850,187.

BACKGROUND

This invention relates generally to object identification systems, and more particularly to portable object identification systems and methods for communicating with a remote host system.

Shipping containers, pallets, railroad cars, automobiles and the like need to be identified while they are in use. Systems for remote identification using active or passive "tags" which back scatter modulate a continuous wave reflecting a modulated signal with a digital identification code have been described in U.S. Pat. Nos. 4,739,328, and 4,888,591, assigned to the same assignee as this invention. The back scatter modulated signal is received, usually by the same system which transmitted the original signal (source), and the digital code is demodulated and decoded, providing identity information which may be processed as desired.

In many applications of these systems, the objects seeking to be identified are located in an environment which does not facilitate the use of a fixed reader system. In these kinds of systems, a portable reader may be employed to recover object data, and thereafter communicate that data with a base unit located remotely. Accordingly, the portable reader must be able to store the information recovered (for uploading at a future time) or alternatively be fitted with a transmission source for real time transmission of the information back to a base unit.

One good example is in a cargo ship environment. Typically, cargo ships transport containers which may be destined for off loading at various ports along the cargo ship's route. It would be desirable to be able to attach to each shipping container an electronic tag which identified the destination port for each container, to assist loading the cargo ship and to assure the proper off loading of each container. A portable unit capable of reading the electronic tag information would be desirable in such an environment. Ideally, such a portable reader would be capable of (1) reading the identification information stored in the tag associated with a given container and (2) displaying the relevant information upon a successful read. In addition, the portable unit should be small (hand held), operate on minimum power and be capable of transmitting the information to a base unit for processing in real time.

In some environments the attachment of an electronic tag to a package or container may not be feasible or cost effective. Other means of identifying a particular object may be required. For example, objects may be identified by the use of a bar code. Alternatively, a textual code (serial number or the like) may be employed. Accordingly, the identification of an object may require multiple readers depending on the format of the object identifiers employed.

SUMMARY OF THE INVENTION

In general, in one aspect, the invention provides an apparatus for object identification including a multi-meter terminal. The multi-meter terminal includes a plurality of data modules, a triggering device for initiating one of the plurality of data modules to retrieve object identification data from an object, a radio module for downloading the retrieved object identification data to a host and a housing containing the data modules, triggering device and the radio module.

Preferred embodiments of the invention include the following features. The data modules are selected from the group of an RFID reader, a bar code reader, a scanner including text scanner or 2D bar code scanner, a global positioning system module, a voice recognition module including a two way voice module, a machine vision module, a printer, a proximity sensor including a laser, ultrasonic or microwave proximity sensor.

The RFID reader processes multiple tag protocols. The triggering device is responsive to a triggering signal from the host. The multi-meter terminal further includes a user interface and wherein the triggering device is responsive to a triggering signal initiated by the user through the user interface or generated by one of the plurality of data modules or generated manually by a user.

The radio module is integrated with one data module and includes an antenna, a source for generating a radio frequency interrogation signal, a transceiver for transmitting the radio frequency interrogation signal to an electronic tag through the antenna and for receiving a radio frequency signal returned from the electronic tag including encoded data, a data handler for processing the returned radio frequency signal to decode the encoded data from the electronic tag and a mixer for combining the decoded data and the radio frequency interrogation signal for transmission by the transceiver to a remote host.

The antenna includes an omnidirectional antenna, a directional antenna and means for coupling the transceiver to the omni-directional antenna during uploading operations and coupling the directional antenna to the transceiver during tag reading operations. The omni-directional antenna is a whip antenna.

The source includes a spread spectrum radio or a frequency hopping spread spectrum radio or a narrow band radio. The radio module provides a link as part of a wireless wide area network or local area network connection to the host.

The multi-meter terminal further includes a user interface for receiving commands and a user display for displaying status information associated with read, uploading and downloading operations. The user interface is a keyboard, a touch screen or a voice recognition system. The housing is a hand-held portable design.

In another aspect of the invention, an object identification system includes an object including object identification data and a portable reader. The portable reader includes a plurality of data modules, a triggering device for initiating one of the plurality of data modules to retrieve object identification data from an object, a radio module for downloading the retrieved object identification data to a host and a portable housing containing the plurality of data modules, triggering device and the radio module.

Preferred embodiments of the invention include the following features. The object includes an electronic tag for storing the object data. The electronic tag is a read/write tag. The read/write tag receives data from the host. The portable reader includes a user interface and where the read/write tag receives data from the user interface.

The radio module is integrated with one data module and includes an antenna, a source for generating a radio frequency interrogation signal, a transceiver for transmitting the radio frequency interrogation signal to an electronic tag at the object through the antenna and for receiving a radio frequency signal returned from the electronic tag including encoded data, means for processing the returned radio frequency signal to decode the encoded data from the electronic tag and means for combining the decoded data and the radio frequency interrogation signal for transmission by the transceiver to a remote host.

In another aspect of the invention, a method is provided for identifying an object including the steps of retrieving a template associated with an object to be identified, displaying the template for a user, triggering an interrogation of a desired object by an object identifier module, retrieving object identification data, loading the object identification data into the template and when a template is full, downloading the object identification data to a host.

Preferred embodiments of the invention include the following features. The method includes the further steps of receiving the template associated with an object to be identified from the host, and receiving commands and data from the host for controlling the retrieval and loading of object identification data from the object.

In another aspect of the invention, a multi-meter terminal for identifying objects includes a radio frequency module for generating an interrogation signal for transmission to an object, one or more reader modules for receiving identification data from the object responsive to the interrogation signal, a trigger device for initiating one of the one or more reader modules to retrieve object identification data from an object and a controller within the portable unit for gathering identification data received from the object and combining the identification data with the interrogation signal from the radio frequency module for transmission to a base unit.

Preferred embodiments of the invention include the following features. One of the one or more reader modules is an RFID reader and wherein the radio frequency module is integrated with the RFID reader module. The integrated RFID reader and radio frequency module includes a transceiver capable both of reading identification information from electronic tags and transmitting collected information to a base unit for remote analysis. The transceiver is used to receive information from a base unit and write data to read/write electronic tags. The apparatus includes a user interface for initiating commands locally by a user and a user display for displaying status information associated with reading, downloading, or uploading processes and a portable housing for containing the one or more reader modules, trigger device, controller and the radio module. The controller receives data and commands from the base unit for local processing and transfer to a read/write electronic tag.

One advantage of the invention is that a single integrated radio module is provided for communication to both a host and an electronic tag.

Another advantage of the invention is that the multi-meter terminal is capable of supporting local data entry as well as host downloads to facilitate easy user operation.

Other advantages and features will be apparent from the following description and claims.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, served to explain the principles of the invention.

DETAILED DESCRIPTION

Figure 1:
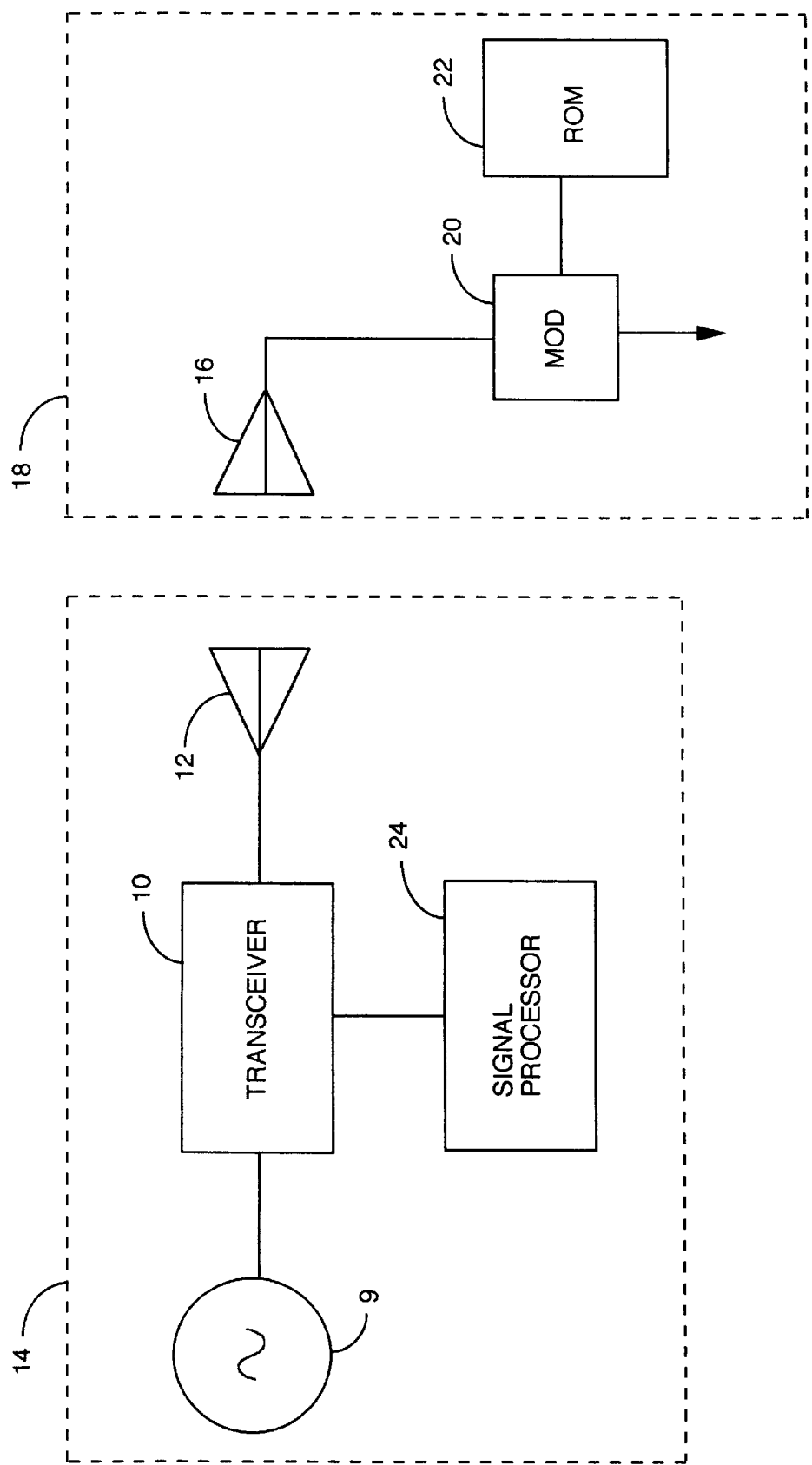
FIG. 1 is a schematic diagram of a prior art identification system.

Referring to FIG. 1, a source 9 for generating and interrogating radio frequency (RF) signals is connected to a transceiver 10 at a reader, generally indicated at 14. The interrogating RF signal from the source 9 may have a suitable frequency such as 915 MHZ. When the source 9 is energized, transceiver 10 transmits the interrogating RF signal through antenna 12 to a suitable antenna 16 (such as a dipole antenna) in an electronic tag (transponder) 18. The transponder 18 is associated with an object (not shown) and is used to identify the object. The transponder 18 includes a data source such as a read-only memory (ROM) 22, which provides a sequence of binary 1's and binary 0's in an individual pattern to identify the object.

A binary "1" in the ROM 22 causes a modulator (MOD) 20 to produce a first plurality of signal cycles and a binary "0" in the ROM 22 causes the modulator 20 to produce a second plurality of signal cycles different from the first plurality of signal cycles. The plurality of signal cycles sequentially produced by modulator 20 to represent the pattern of binary 1's and binary 0's which identify the object are introduced to the dipole antenna 16 for reflection to antenna 12 at reader 14.

Antenna 12 introduces the received signals to transceiver 10 for processing by signal processor 24. Signal processor 24 produces signals in a sequence identifying the pattern of the 1's and 0's in ROM 22 at transponder 18. The sequence may be compared in reader 14 with a desired sequence to determine whether the object being identified is being sought by the reader or not.

The system described above represents the prior art of an object identification system on a simplified basis. Such a system is disclosed in U.S. Pat. No. 4,075,632, issued on Feb. 21, 1978 to Howard A. Baldwin, Steven W. Depp, Alfred R. Koelle and Robert W. Freyman and assigned of record to the United States of America as represented by the United States Department of Energy. The assignee of record of this invention has obtained rights from the United States government under U.S. Pat. No. 4,075,632 to make, have made, use and sell the invention of that patent.

The system of the present invention employs one or more readers which may be considered to be similar to that shown in FIG. 1 and described above.

Figure 2:
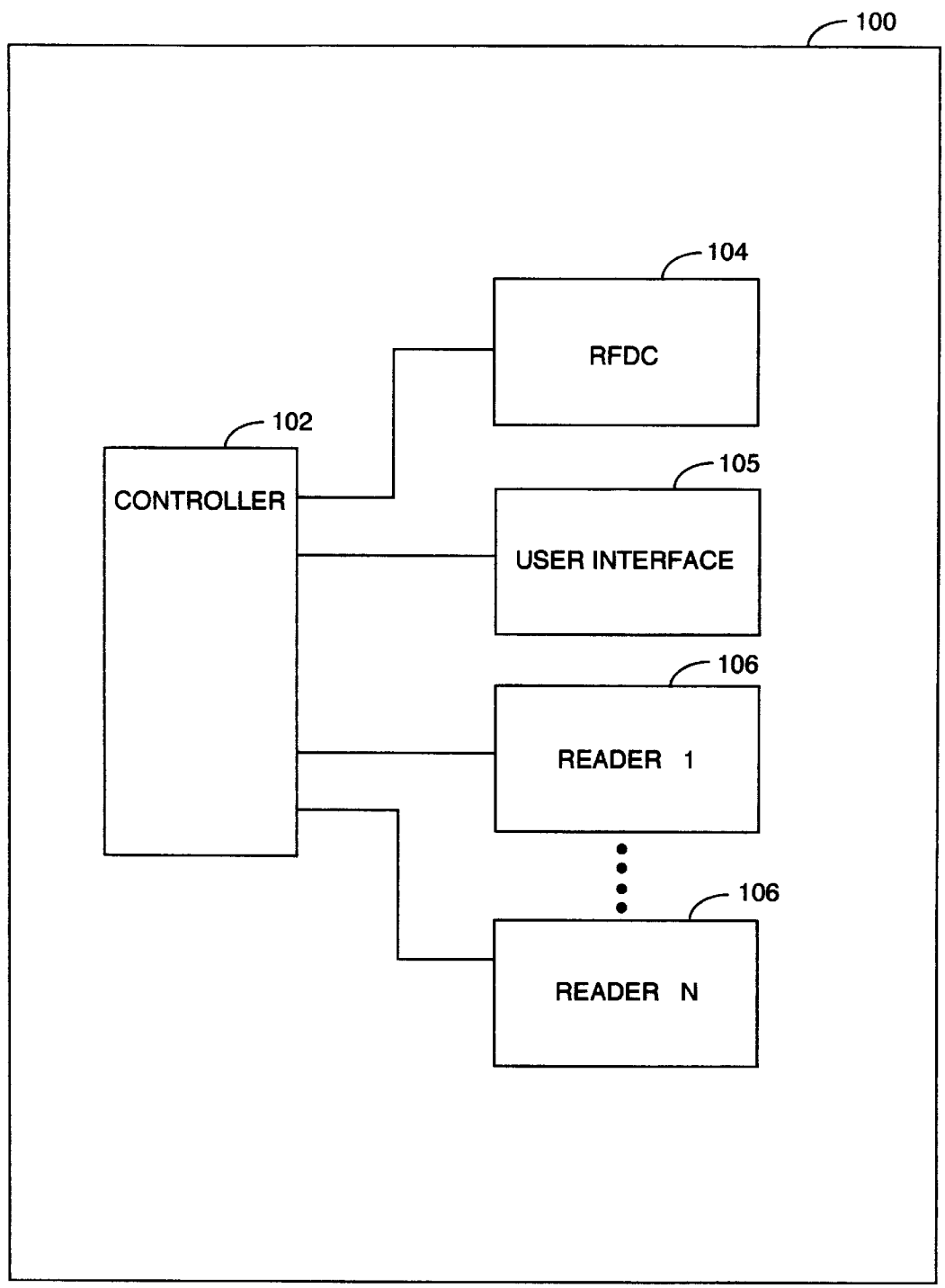
FIG. 2 is a schematic block diagram of a multi-meter terminal according to one embodiment of the present invention.

Referring to FIG. 2, a portable multi-meter terminal 100 includes a controller 102, an RFDC (radio frequency data communication) module 104, a user interface 105 and one or more reader/data modules 106. User interface 105 includes a display and keypad or touchscreen (not shown). User interface 105 may also include a voice recognition system by which the user may control operation of the multi-meter terminal. Each reader/data module 106 interfaces with controller 102, providing identification information or other data to RFDC module 104 for transmission to a host.

The RFDC module 104 provides a real-time radio communication between mobile terminals and an application program running in a host computer. The system topology of a RFDC system typically consists of multiple, partially overlapping cells which cover the desired area. Each cell has a base station for servicing the radio terminals that happen to be within the cell at any given time. The base station of each cell is wired (directly or indirectly, e.g., by a Wireless LAN, or wireless wide area network) to a network controller. Some implementations of the RFDC module require one (and only one) network controller, others are implemented in fully distributed fashion where any one base station may provide network controller functions for itself and other base stations. The network controller provides access to an application program executed on a host computer via a wired LAN, wireless wide area network or a common carrier. In one embodiment of the present invention, the RFDC module is connected to only one host computer. Alternatively, many hosts may be connected to a base station to access data from any local terminal.

The object identification system is a transactional system where "transactions" are performed at the radio terminal. In one embodiment, the host application program provides information defining a transaction and it may also provide information related to the type and constrains of data entered at the multi-meter terminal. Typically, the transactions involve scanning one or more bar codes, reading a electronic tag or other object identifier and may include a user keypad entry of information such as quantity. In addition, the transaction may require data processing at the multi-meter terminal, storage of data at the multi-meter terminal for download at a later time, or other functions as desired. The transaction results may be transmitted to the application program in the host computer which functions as a posting processor of the transaction.

The significant advantage of the real-time communication with the host computer is that all transactions including each and every single exception are handled and dispensed with in real-time. This results in an accurate and up-to-date computer database and truly significant improvement in the speed and accuracy of such activities.

In one embodiment of the present invention, two reader/data modules 106, an RFID (radiation frequency identification decoder) module and a bar code reader module, are attached to controller 102. The RFID module may include data handlers for processing multiple tag protocols in a single RFID module. The RFID module allows for the reading of electronic tags, while the bar code reader module is included to allow a user to read bar codes from various packaged products. Alternatively, other types of reader/data modules may be incorporated into the portable multi-meter terminal including a scanner module (CCD scanner or the like) for reading textual information, a 2D bar code reader, or a machine (robotic) vision module.

In another embodiment of the invention, data modules are attached to controller 102. A GPS (global positioning system) module may be included so that the portable terminal may be able to be precisely located when deployed in the field. Another type of data module which can be attached to controller 102 is a voice recognition system. The voice recognition system includes a natural language processor which is used to transform voice commands or data into an electronic form that is understandable by controller 102. In one embodiment, the voice recognition system includes a two-way voice communication module for allowing the operator to communicate with an operator at the host.

Another type of data module that may be included in the multi-meter terminal is a proximity sensor module. Proximity sensors may be used to convey positional information, or alternatively may be used to detect objects to be interrogated and subsequently trigger the identification of the object. A proximity sensor module may include a laser sensor, a microwave sensor or ultra-sonic sensor.

Other types of modules may also be included in the multi-meter terminal for assisting in the collection of object data. Other modules include a printer (thermal printer or the like) and a voice synthesis module for providing audio feedback to the user.

Figure 3:
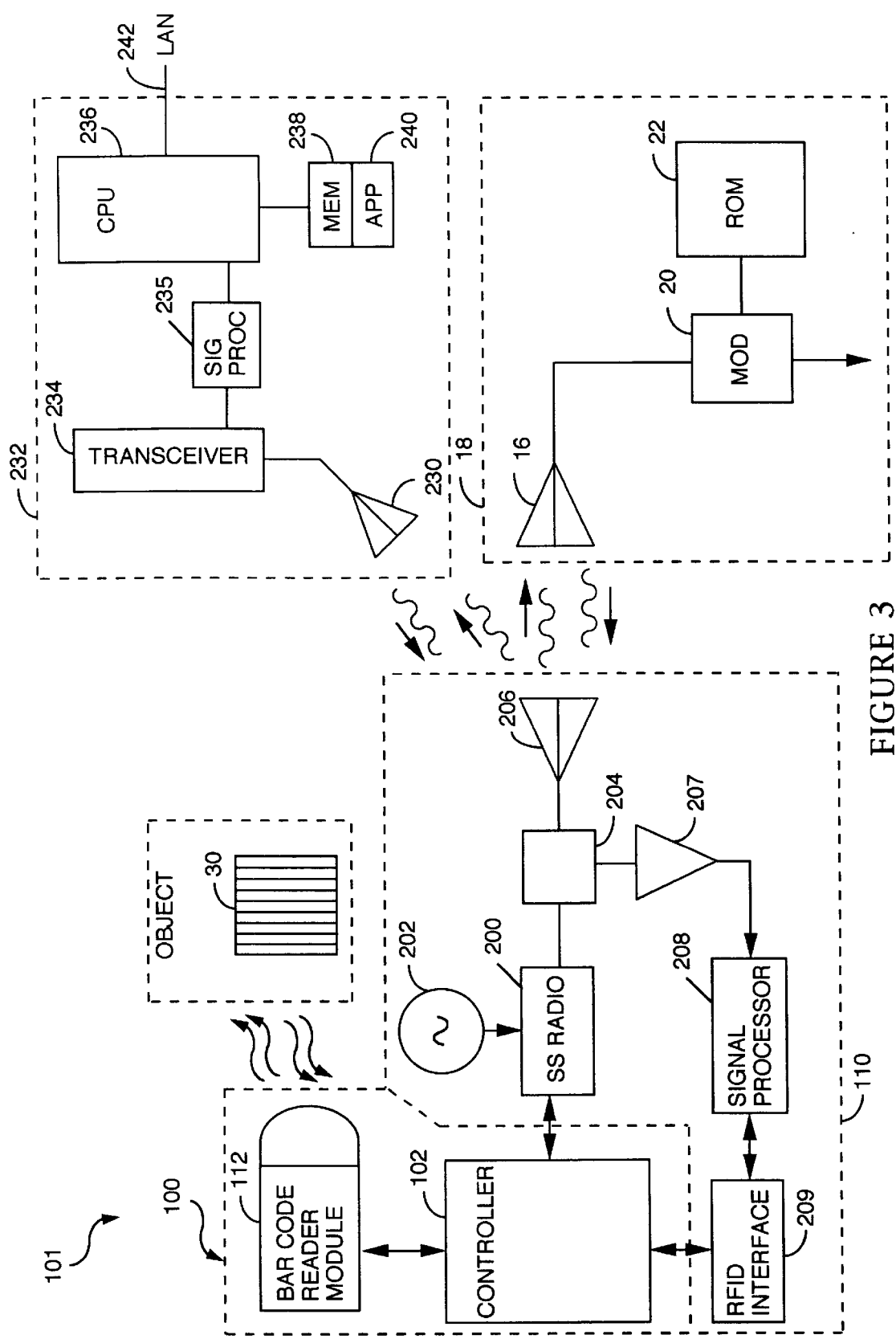
FIG. 3 is a schematic diagram of an identification system according to one embodiment of the present invention.

Referring to FIG. 3, in one embodiment of the present invention, multi-meter terminal 100 is used in conjunction with an object identification system 101. The object identification system 101 includes the multi-meter terminal 100 (object identifier), one or more objects (not shown) which may include either a transponder 18 (electronic tag) or bar code 30 as a means of identification, and a host base station 232. In this embodiment, multi-meter terminal 100 includes an integrated RFDC and RFID module 110, a controller 102, and a bar code reader module 112.

Integrated RFDC and RFID module 110 is used to identify objects employing electronic tags and transmit associated information to a host for processing. In operation, integrated RFDC and RFID module 110 generates an interrogation signal for transmission to an electronic tag (transponder) 18. In one embodiment, integrated RFDC and RFID module 110 includes: a radio transceiver, which may be a spread spectrum radio 200 including source 202; a receiver 204; antenna 206; signal processor 208 and RFID interface 209. The spread spectrum radio may be a direct sequence spread spectrum radio or a frequency hopping spread spectrum radio. Alternatively, the radio transceiver may be a narrow band radio.

The spread spectrum radio 200 is coupled by a transmission line to receiver 204, which in turn is coupled to antenna 206. In one embodiment, antenna 206 is a directional antenna. Alternatively, antenna 206 may include both an omnidirectional antenna (whip antenna or the like) and a directional antenna (Yagi, micro strip patch or the like). In this configuration, a control signal is generated by controller 102 to couple spread spectrum radio 200 to the appropriate antenna depending on the application (e.g. coupled to the omnidirectional antenna during uploading operations and coupled to the directional antenna during tag reading and downloading operations).

Spread spectrum radio 200 receives a control signal from controller 102 for initiating the transmission of an interrogation signal (for an electronic tag) from spread spectrum radio 200 through receiver 204 and antenna 206 to a suitable antenna 16 at an electronic tag (transponder 18). In one embodiment, controller 102 generates an RFID ON signal which is coupled to RFID interface 209. The RFID ON signal configures the output of spread spectrum radio 200, decoupling the spreading function as will be described in greater detail below. In addition, the RFID ON signal controls the switching of the data input received by controller 102. When the RFID ON signal is enabled, controller 102 receives data from the RFID interface for processing electronic tag information. Alternatively, when the RFID ON signal is disabled, data from spread spectrum radio 200 may be processed by controller 102.

Transponder 18 is associated with an object (not shown) and is used to identify the object. Transponder 18 includes a data source such as a ROM 22 which provides a sequence of binary 1's and binary 0's as an individual pattern to identify the object.

Responsive to the interrogation signal, a binary "1" in ROM 22 causes modulator 20 to produce a first plurality of signal cycles, and a binary "0" in ROM 22 causes modulator 20 to produce a second plurality of signal cycles different from the first plurality of signal cycles. The plurality of signal cycles sequentially produced by modulator 20 represent the pattern of binary 1's and binary 0's which identify the object. These cycles are introduced to the antenna 16 for reflection to antenna 206 at multi-meter terminal 100.

In one embodiment, transponder 18 may be a read/write electronic tag which includes a detector (not shown) coupled to antenna 16 for detecting modulated write signals received from integrated RFDC and RFID module 110. The write signals may include data to be written to the data source in transponder 18. The write data may originate in the multi-meter terminal or alternatively may originate in the host. In one embodiment, the data source may be a random access memory (RAM) capable of read and write functions. The write sequence to transponder 18 will be described in greater detail below in association with transfers of data from the host to the multi-meter terminal.

Antenna 206 introduces the received signals to receiver 204 for processing by signal processor 208. In one embodiment, receiver 204 is a homodyne receiver. Signal processor 208 produces signals in a sequence having a pattern identifying the pattern of 1's and 0's in ROM 22 at transponder 18. Thereafter, the sequence is transferred to the controller 102 for processing. The processing of input data will be described in greater detail below in association with FIG. 17.

Once processing is complete, controller 102 may display the information to a user operating the identification unit by means of a display (not shown), or conversely may transfer the information through a radio frequency (RF) or wireless local area network (LAN) connection to a host computer(not shown). The host computer has associated with it an application for processing transactional data received from multimeter terminal 100. Specifically, controller 102, upon identification of a sequence for transmission, will transfer the sequence to spread spectrum radio 200. Spread spectrum radio 200 receives the sequence (transmit data or TXDATA), modulates it and provides a direct sequence spread spectrum signal for transmission through receiver 204 and antenna 206 to a suitable antenna 230 in a host base station 232.

Host base station 232 includes transceiver 234, signal processor 235, central processing unit (CPU) 236 and associated memory unit 238. Transceiver 234 receives and decodes the direct sequence spread spectrum signal (receive data) and transmits the received data to signal processor 235 for data manipulation. Signal processor 235 includes one or more registers for storing received data and may include registers for storing identification information associated with objects being sought by the host. Memory unit 238 includes software applications 240 for execution by CPU 236 for processing data received from remote units and for initiating data transfers from host base station 232 to remote readers and to a host computing system. Applications 240 associated with host base station 232 may compare the data received from multi-meter terminal 100 with desired sequences stored in host base station 232 to determine whether or not the object being identified is being sought by the host or not. In addition, host base station 232 includes a Wireless LAN connection 242 for communicating to the host computer or other computers in a computing system.

Host base station 232 may facilitate the comparison or manipulation of data sequences processed by multi-meter terminal 100 by transmitting data through transceiver 234 and antenna 230 to antenna 206. Alternatively, host base station 232 may transfer data to multi-meter terminal 100, which may be subsequently written to transponder 18 as part of a write operation associated with a read/write tag. The data transferred from host base station 232 is received by spread spectrum radio 200 and demodulated for use by controller 102 and/or storage in a memory (not shown). The data may be in the form of object identification sequences for matching at the remote location, or new or revised templates for storage in memory, or directions to the reader operator associated with the next operation to be performed, or other data and commands for operating the object identification system. Alternatively, the data may include both a command to initialize a write sequence to transponder 18 and associated data to be written to the transponder.

In one embodiment of the present invention, host base station 232 is configured to process data sequences from a plurality of readers. In this embodiment, applications 240 include methods for handling multiple streams of data.

Figure 4:
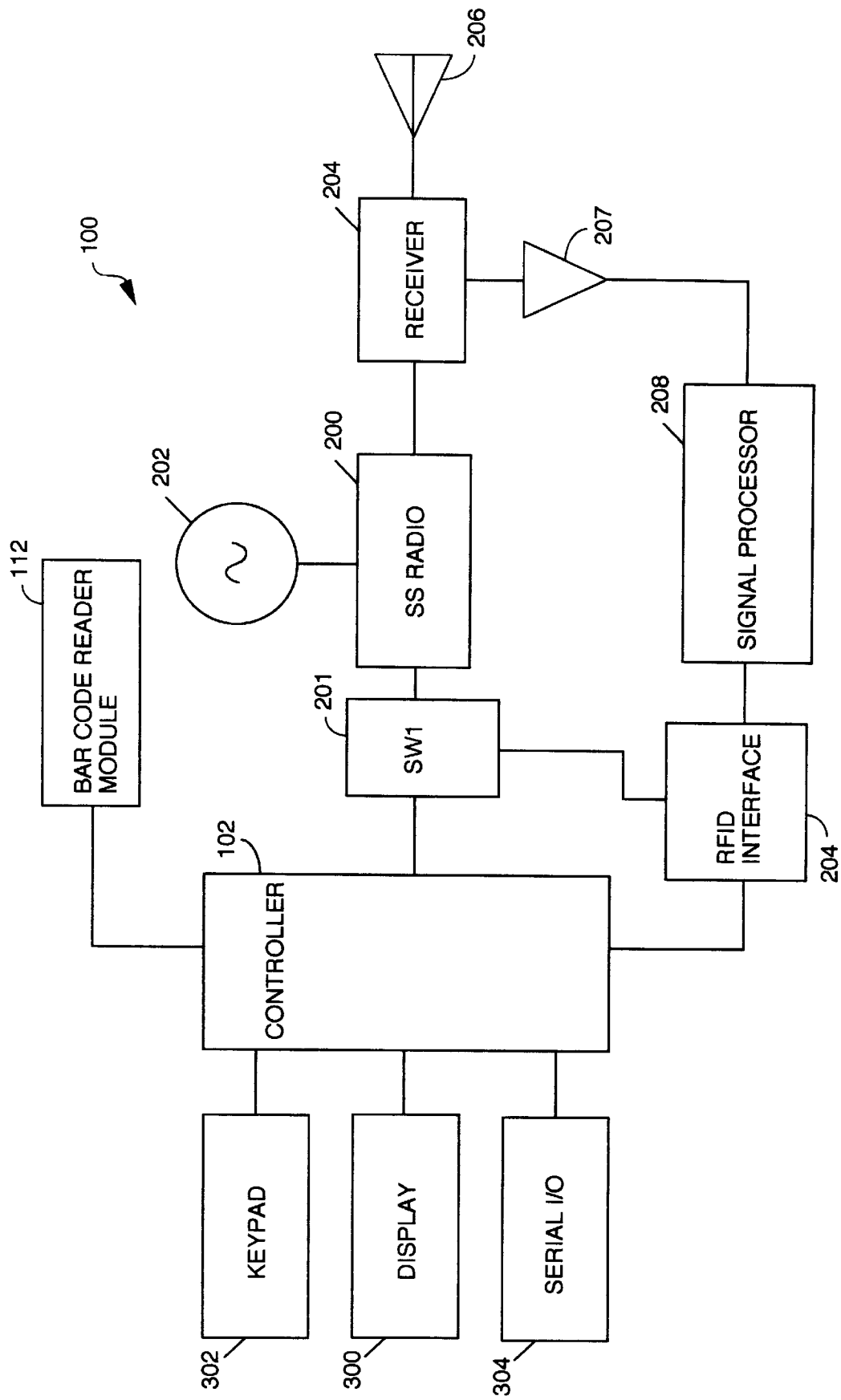
FIG. 4 is a detailed schematic block diagram of a multi-meter terminal according to one embodiment of the present invention.

Referring to FIG. 4 which shows multi-meter terminal 100 in more detail, terminal 100 includes a display 300, keypad 302 and serial I/O interface 304 for communicating with a local user of terminal 100. Associated with controller 102 is a memory (not shown) for storing templates for use in displaying information collected by the multi-meter terminal from a object. Templates are electronic forms for displaying the data received from (or associated with) an electronic tag or other object identifier, and may include identification data, time, and date information, as well as command options related to the type and processing of individual input fields and the template as a whole (store, upload, download, etc.).

In one embodiment of the present invention, between controller 102 and spread spectrum radio 200 is a switch 201. Switch 201 controls the flow of data between the controller 102 and the radio and the data processing portions of the integrated RFDC and RFID module as will be described in greater detail below in association with FIG. 5.

In one embodiment, a trigger device (not shown) receives a trigger signal to select a function indicated by display 300 or alternatively to initiate the interrogation of an object. The trigger signal may be generated by one or more reader or data modules (such as a proximity sensor, or the like), the user through the keypad, touch display or other input device, or may be down loaded from the host. Keypad 302 is coupled to controller 102 for receiving keystroke commands from a user operating multi-meter terminal 100. Display 300 displays status information associated with interrogations of objects and also status information associated with communications with host base station 232.

Figure 5:
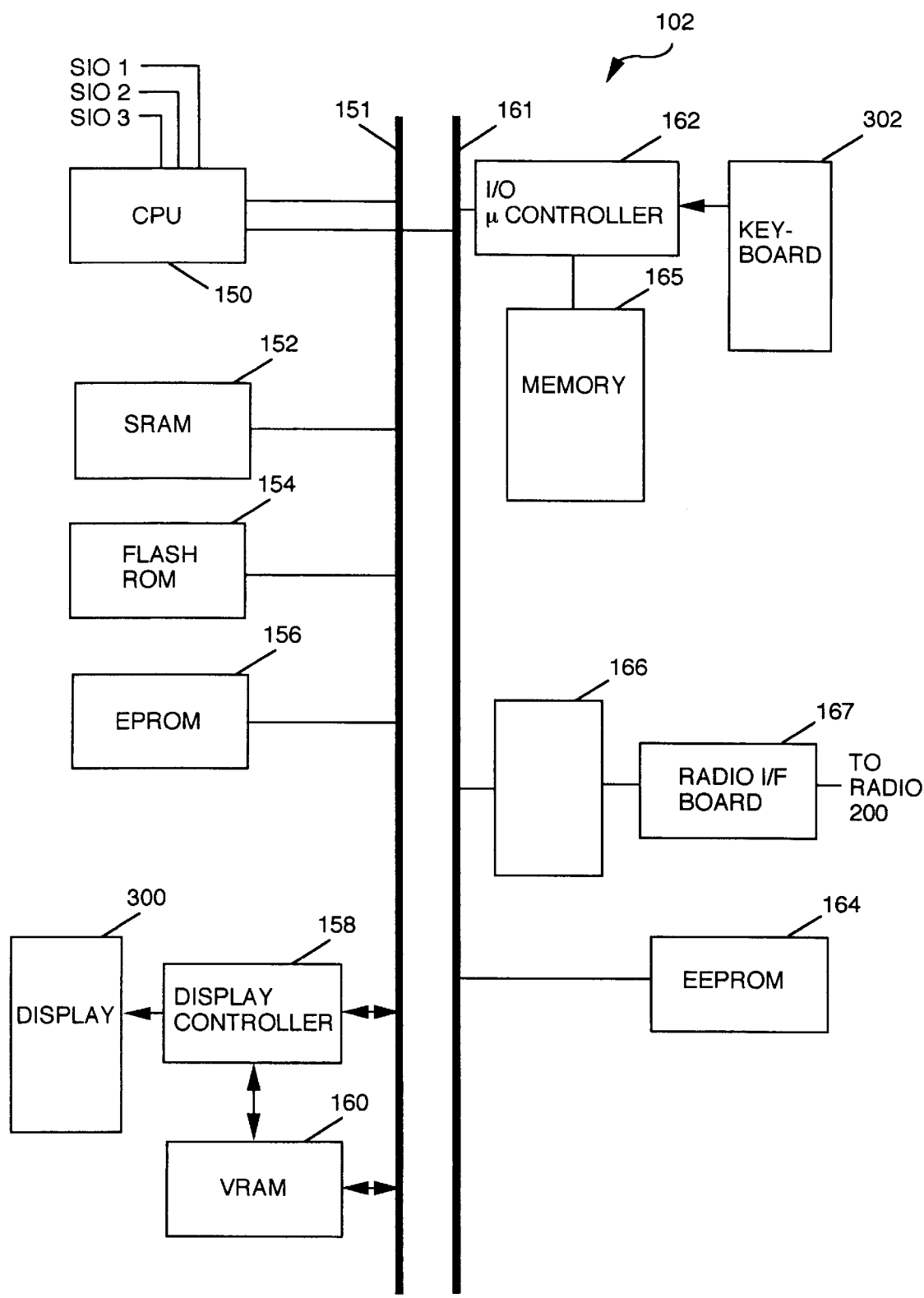
FIG. 5 is a schematic block diagram of a controller according to one embodiment of the present invention.

Referring to FIG. 5 controller 102 includes a central processing unit (CPU) 150 which is connected by an address and data bus 151 to a static random access memory (SRAM) 152, flash read only memory (ROM) 154, erasable programmable read only memory (EPROM) 156, display controller 158 and video random access memory (Video RAM) 160. Display controller 158 is also coupled to display 300. CPU 150 is coupled by means of a serial data I/O bus 161 to an I/O micro controller 162, radio interface connecter 166 and electronically erasable programmable read only memory (EEPROM) 164. Attached to an I/O micro controller 158 is a memory 165. Attached to the radio interface connecter 166 is a radio interface circuit board 167 which in turn is attached to spread spectrum radio 200 (not shown). In one embodiment, CPU 150 is a part number 68302, produced by Motorola, Inc.

Stored within flash ROM 154 are various control and user applications. In one embodiment of the present invention, a radio control program, presentation manager, parameter manager, and data application manager are included.

The radio control program operates the radio 200 (FIG. 3) via the radio I/F board 167 and implements the radio communication to and from the host base station 232 (FIG. 3). The radio protocol complexity may vary from simple models to full feature Wireless LAN as described in IEEE 802.11 Draft Standard. The radio control program also provides a user interface for monitoring various radio features. The application allows the user to set frequencies for various oscillators in the spread spectrum radio and change settings of the radio to allow it to be processed through its different radio modes.

The presentation manager manipulates virtual screens and presents screens to the display for presentation to a user. The presentation manager also operates the display controller to generate the output screens for display 300. The presentation manager operates on a number of virtual screens. A virtual screen is a series of independent, overlaid windows with text and attributes. A virtual screen (or screens) is presented on the display when downloaded from a host, as requested by the user or as previously configured and recorded by the parameter manager.

The parameter manager application saves and restores operational parameters associated with the multi-meter terminal. The parameter manager may be invoked in order to load new parameter settings which are stored in EEPROM 164.

A data handler manages the input of data from reader/data modules in the multi-meter terminal and the transfer of data to a host computer via the RFDC portion of the integrated RFDC and RFID module. The data handler application opens up a communication link through the spread spectrum radio to start a session with a host. Thereafter, the data handler will receive back from the host a template which includes instructions for creating a virtual display for display to the user. In one embodiment of the present invention, the templates are stored in the multi-meter terminal and may be called up by a user depending on the type of data transfer operation which is desired. When the data handler application receives a template from a host, the data handler displays any virtual screens associated therewith to the end user. Thereafter, the data handler accepts data associated with entries to be filled in a given template and, at the completion of a data retrieval operation, transmits the data back to the host via the RFDC portion of the integrated RFDC and RFID module.

EPROM 164 stores all operational parameters associated with the multi-meter terminal, including set-up information associated with the configuration for the unit. In one embodiment, EEPROM 164 stores operational parameters for a bar code reader module and RFID module. Other parameters may be stored depending on the configuration of the multi-meter terminal.

Also coupled to CPU 150 are a plurality of serial input/output ports SIO1, SIO2 and SIO3. In one embodiment of the invention, the SIO2 port is connected to switch 201 (FIG. 4) which switches between the RFDC and RFID portions of the integrated RFDC and RFID module. The SIO2 port is configured as a two-way data port which, depending on the status of the RFID ON command, will either link the controller to the spread spectrum radio or to the signal processor in the RFID portion of the integrated RFDC and RFID module. Generally, when data is flowing out of CPU 150, it flows to the radio for transmission to either a host or to a writable tag (not shown). When the port is configured as an input port, data is received by CPU 150 for processing from either the host or from an electronic tag 18 (FIG. 3) via signal processor 208 (FIG. 3) depending on the configuration of switch 201 (FIG. 4). The SIO3 port is configured to receive data from other modules in multi-meter terminal 100 (FIG. 3), for example data from a bar code module 112 (FIG. 3) or other device. SIO1 port is used to drive an output device such as a printer from the multi-meter terminal and/or receive data from other data/reader modules.

Figure 6:
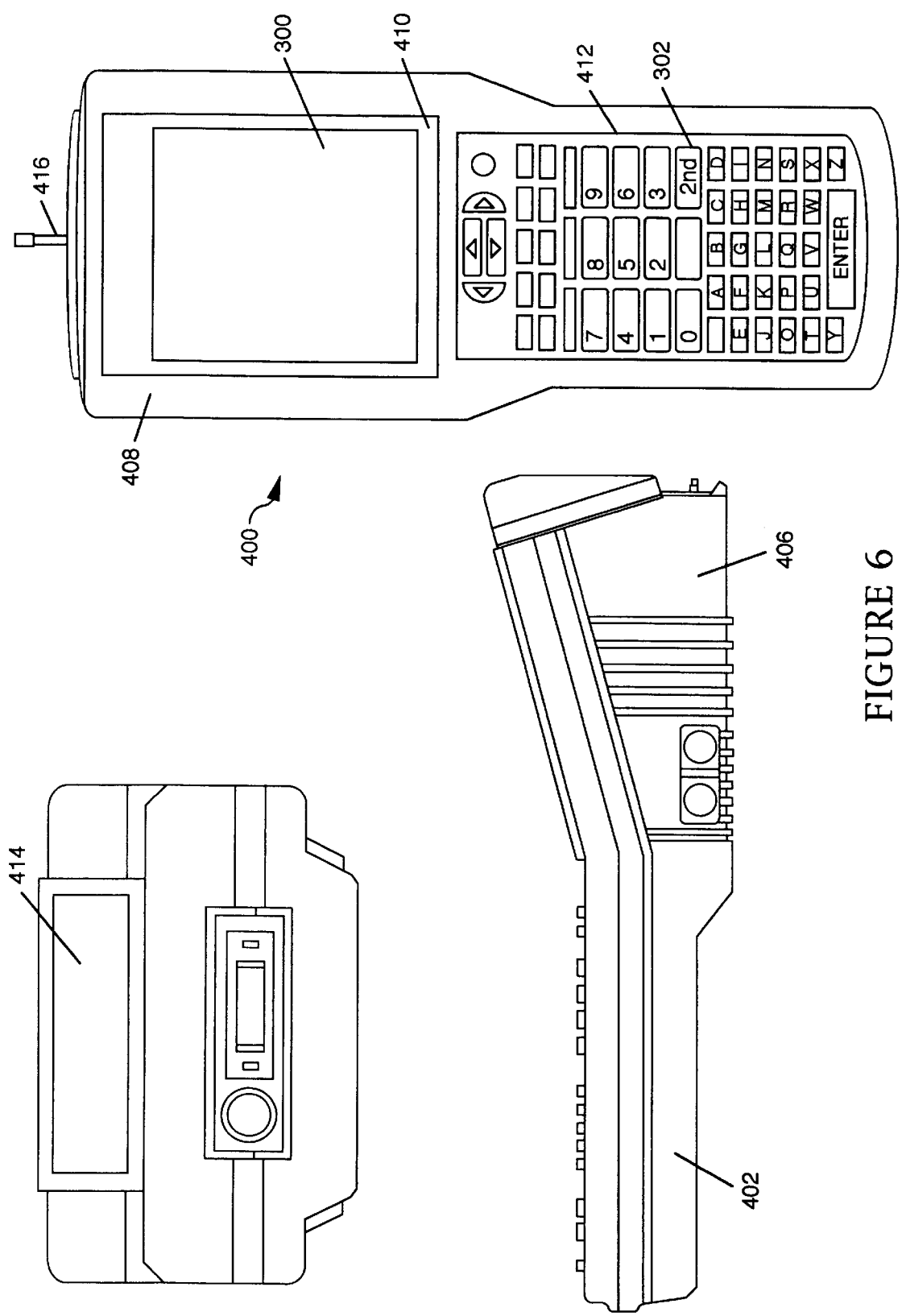
FIG. 6 is a perspective view of a reader housing according to one embodiment of the present invention.

Referring to FIG. 6, in one embodiment of the invention, multi-meter terminal 100 (FIG. 3) is packaged in a hand held base unit generally indicated at 400, which includes a handle portion 402, a trigger 404 (not shown) and a body portion 406. The base unit 400 includes a top surface 408 which includes cutouts 410 and 412 for receiving display 300 and keyboard 302 respectively. Body portion 406 includes a forward face which is roughly perpendicular to top surface 408 which includes a window 414 for allowing the transmission and reception of radio frequency signals. In one embodiment, antenna 206 includes a telescoping portion (416) which may be deployed for better signal reception.

Figure 7:
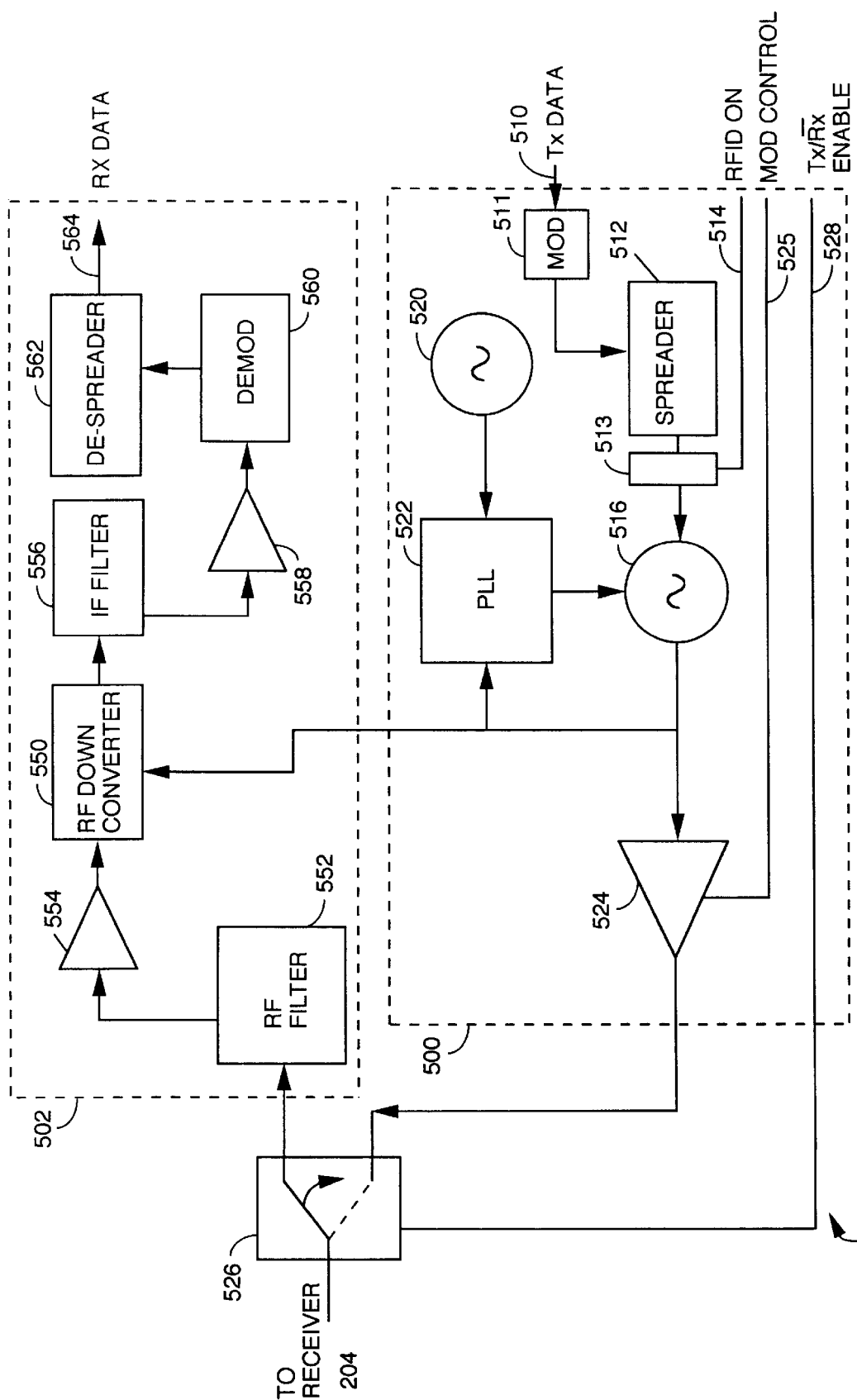
FIG. 7 is a schematic block diagram of a transceiver according to one embodiment of the present invention.

Referring to FIG. 7, a detailed block diagram of spread spectrum radio 200 is shown. Spread spectrum radio 200 includes a transmit side, generally indicated at 500, and a receive side generally indicated at 502. Transmit side 500 includes a transmit data (TXDATA) port 510 for receiving baseband data to be transmitted from controller 102 (FIG. 3) to a host computer. TXDATA port 510 is coupled to an input of a modulator 511 whose output is coupled to a spreader 512. The baseband information received at TXDATA port 510 is modulated by modulator 511, resulting in an intermediate frequency (IF) signal which is the combination of the baseband data and an IF carrier. Spreader 512 combines the IF signal with a spreading signal resulting in a spread IF signal. In one embodiment, spreading signal is a pseudo noise (PN) signal. While the invention has been described with a particular ordering of the signal processing steps, the spreading and modulation functions may be interchanged in the sequence.

In one embodiment, the output of spreader 512 is introduced as an input to switch 513 whose output is coupled to a RF oscillator 516. Switch 513 is enabled and disabled by the RFID ON control signal 514 received from controller 102 (FIG. 3). When multi-meter terminal 100 (FIG. 3) is configured to transmit interrogation signals to a transponder 18 (FIG. 3), then spreader 512 is disabled by decoupling the input to RF oscillator 516 via switch 513. The decoupling of the spreader allows for easier data processing of signals received in response to an interrogation signal generated by the integrated RFDC and RFID module 110 (FIG. 3).

An oscillator 520 provides an input to a phase lock loop 522 whose output is introduced into the RF oscillator 516. The output of RF oscillator 516 is fed back as an input to the phase lock loop 522 and as an input to an RF down converter 550 in the receive side 502 of spread spectrum radio 200. The feedback of the output signal from RF oscillator 516 acts as a control signal to vary the output of the phase lock loop 522 as required. In addition, the output of the RF oscillator 516 is provided to the RF down converter 550 in order to down convert (strip out the RF signal) received data signals from host base station 232 (FIG. 3).

The output of RF oscillator 516 is introduced into a RF amplifier 524 which in turn is coupled to a duplexor 526. A modulation control signal 525 from controller 102 (FIG. 3) is coupled to RF amplifier 524. The modulation control signal may be utilized to modulate the output signal from the transmit side for use during download operations (writes to a read/write transponder). Duplexor 526 is an RF switch which is toggled by a receive enable (TX/rx enable) signal 528 generated by controller 102 (FIG. 3). The common port of duplexor 526 is coupled to an input of receiver 204 (FIG. 3) which in turn is coupled to antenna 206 (FIG. 3). Accordingly, when the receive enable signal 528 is high, the common port of duplexor 526 is coupled to the output of RF amplifier 524 enabling transmission of data from spread spectrum radio 200.

In operation, the transmit side transmits both interrogation and data signals for receipt by an electronic tag 18 (FIG. 3), and data signals for receipt by host base station 232 (FIG. 3). In one embodiment, an interrogation signal is comprised of a carrier signal generated by RF source 520 in the absence of transmit data. Alternatively, controller 102 (FIG. 3) may provide a sequence of all "0's" or all "1's" or another optimized pattern. In one embodiment, a unique pattern of 1's and 0's is provided which may be detected by detector 207 (FIG. 3) to discriminate invalid RF signals which are received by antenna 206 (FIG. 3). In one embodiment, the interrogation signal is modulated by enabling and disabling modulation control signal 525, thereby providing a modulated output signal which may be read by a detector in a read/write electronic tag. Interrogation signals are transmitted by disabling receive enable signal 528 from duplexor 526, enabling transmission of data through antenna 206 (FIG. 3) to transponder 18 (FIG. 3).

The transmit side is used to forward data received from the host base station 232 (FIG. 3) for transmission to transponder 18 (FIG. 3). Host base station 232 (FIG. 3) may download information to be written to transponder 18 (FIG. 3) by transmitting data through transceiver 234 (FIG. 3) and antenna 230 (FIG. 3) to antenna 206 (FIG. 3) in multi-meter terminal 100 (FIG. 3). The data transferred from host base station 232 (FIG. 3) is received by spread spectrum radio 200 and demodulated for use by controller 102 (FIG. 3). Controller 102, will initialize a write sequence to transponder 18 (FIG. 3).

The write sequence begins by disabling receive enable signal 528 to spread spectrum radio 200 (by controller 102 in FIG. 3). In one embodiment, the data to be transferred is encoded by modulating the spread spectrum carrier wave generated by the transmit side of the spread spectrum radio. This results in a on-off cycling of the spread spectrum carrier signal output to transponder 18 (FIG. 3) which may be detected and decoded by a detector in transponder 18 (FIG. 3). Thereafter, the data may be written to RAM for storage.

Alternatively, the transmit side may upload object information retrieved from transponder 18 (FIG. 3). The upload routine begins by disabling the receive enable signal 528 to spread spectrum radio 200 by controller 102 (FIG. 2). The baseband data is introduced to TXDATA port 510 which in turn is coupled to an input of a modulator 511 whose output is coupled to a spreader 512. The baseband information received at TXDATA port 510 is modulated by modulator 511, resulting in an intermediate frequency (IF) signal which is the combination of the baseband data and an IF carrier. Spreader 512 combines the IF signal with a spreading signal resulting in a spread IF signal. The output of spreader 512 is coupled to RF oscillator 516 via switch 513, whose output is introduced into a RF amplifier 524 which in turn is coupled to a duplexor 526. Duplexor 526, having been enabled for transmit mode by disabling receive enable signal 528, drives an RF output signal through receiver 204 (FIG. 2) and antenna 206 (FIG. 3) to a suitable antenna in a host base station 232 (FIG. 3).

Referring now to receive side 502, duplexor 526 includes a second port which is coupled to an RF filter 552 whose output is introduced into an amplifier 554. The output of amplifier 554 is introduced into RF down converter 550 whose output is introduced into a intermediate frequency (IF) filter 556. RF down converter 550 uses the RF output signal from RF oscillator 516 in transmit side 500 to down convert received RF signals to an intermediate frequency.

The output of intermediate frequency filter 556 is introduced into an intermediate frequency amplifier 558 whose output is coupled to demodulator 560. Intermediate frequency filter 556 and amplifier 558 isolate the portion of the spectrum associated with received data for demodulation by demodulator 560. The output of demodulator 560 is coupled to de-spreader 562 whose output is coupled to a receive data (RXDATA) port 564 for transmission to controller 102 (FIG. 3). Demodulator 560 removes a spread baseband data signal from an intermediate frequency carrier wave, while de-spreader 562 removes the spreading sequence, resulting in baseband data on RXDATA port 564.

In order to receive data transmissions, controller 102 (FIG. 3) asserts a disable signal on receive enable signal 528, switching the common connection of duplexor 526 to couple received RF signals from antenna 206 (FIG. 3) to the input of RF filter 552. The received RF signals are filtered and amplified by RF filter 552 and amplifier 554 before introduction into RF down converter 550. RF down converter 550 utilizes the RF oscillator 516 output signal to down convert the received RF signal producing an intermediate frequency signal output. The intermediate frequency output signal is filtered and amplified by RF filter 556 and 558, respectively, before being introduced into demodulator 560. Demodulator 560 removes the intermediate frequency carrier providing a spread data signal to de-spreader 562. De-spreader 562 performs an inversion of the spreading process performed by spreader 512 resulting in baseband (clear text) data at the RXDATA port 564.

Figure 8:
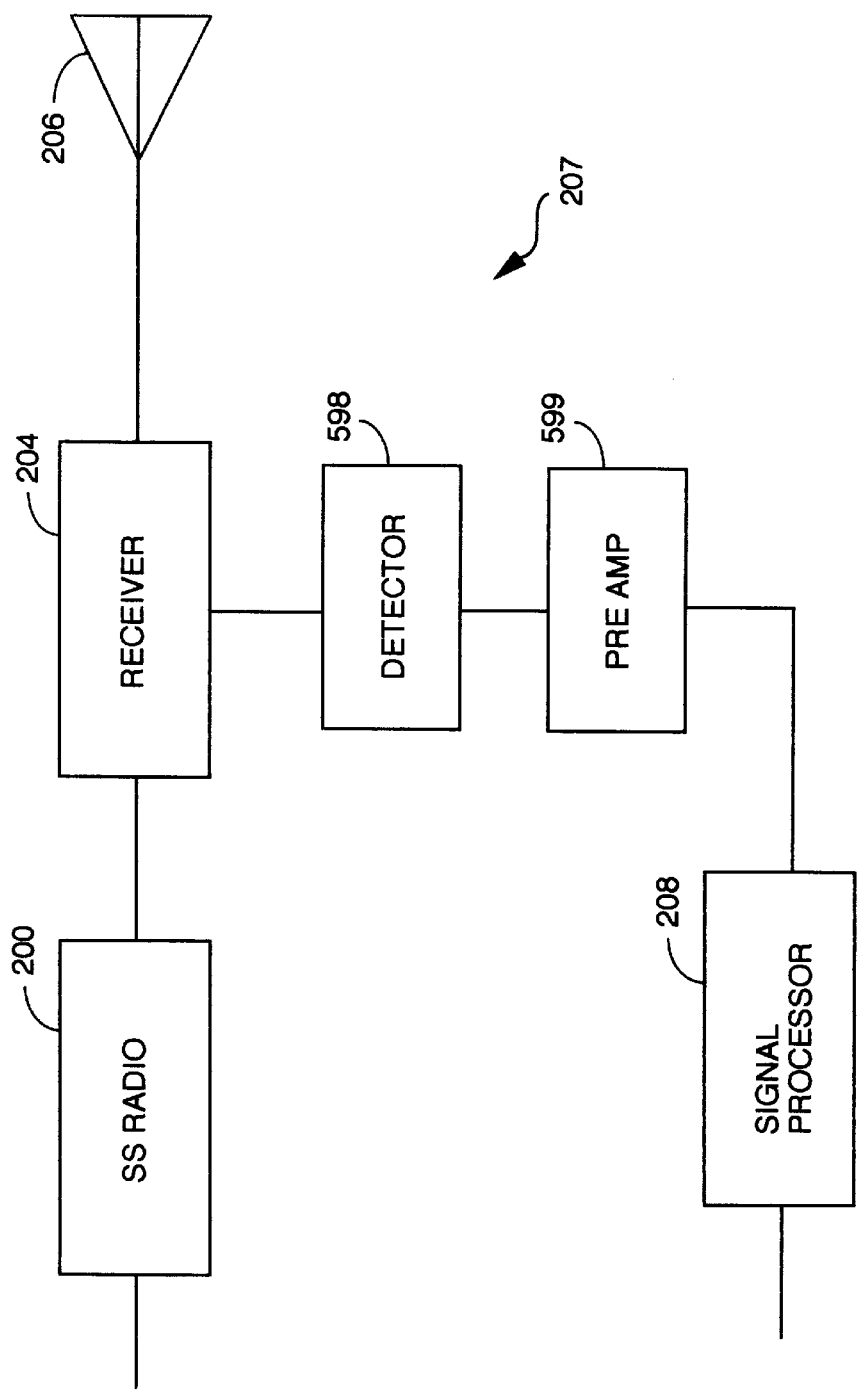
FIG. 8 is a schematic block diagram of a receive portion of the multi-meter terminal of FIG. 4 for receiving and processing RF return signals from an electronic tag according to one embodiment of the present invention.

Referring to FIG. 8, a block diagram for a receive portion of the combined RFDC and RFID module 110 (FIG. 3) associated with detecting radio frequency data reflected from electronic tag 18 (FIG. 3) is shown. Modulated RF signals returned from electronic tag 18 (FIG. 3) are coupled by antenna 206 to receiver 204. The modulated RF signals are detected by a detector, generally indicated at 207.

Figure 9:
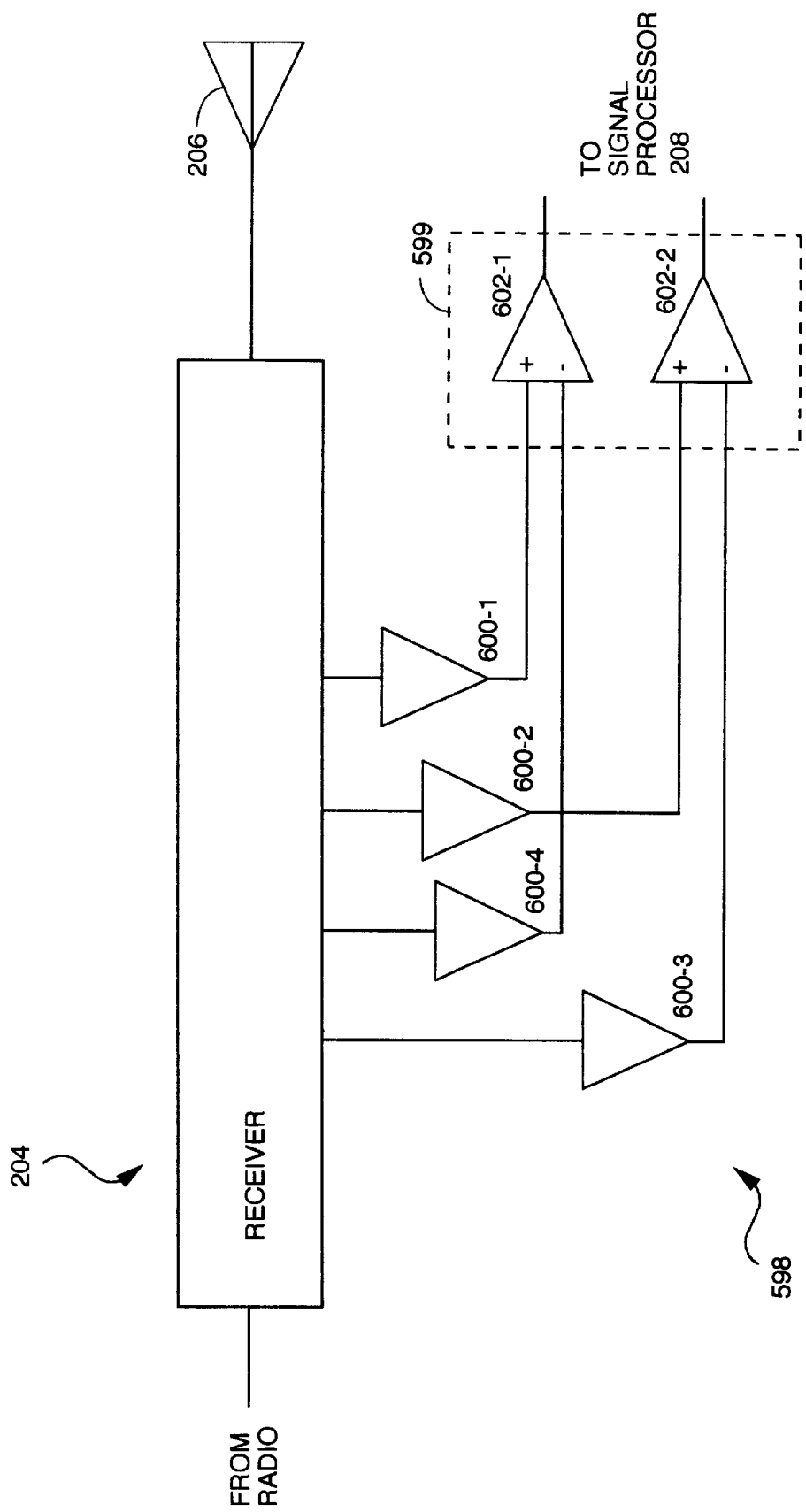
FIG. 9 is a schematic block diagram of the detector and preamplifier of FIG. 7 according to one embodiment of the present invention.

In one embodiment, detector 207 is comprised of detector diodes 598 and preamplifiers 599. Referring to FIG. 9, in one embodiment, detector diodes 598 are configured as four diode detectors 600-1 through 600-4 spaced at 45° intervals, respectively, along a transmission line associated with receiver 204. Outputs from the diode detectors 600-1 through 600-4 are coupled through a signal conditioner (preamplifier) generally indicated at 599. In one embodiment, signal conditioner 599 includes a bandpass filter and a high gain bandpass amplifier. Alternatively, a preamplifier only may be used. In one embodiment, diode detectors are part no. HSMS2802, produced by Hewlett-Packard, Inc.

Preamplifier 599 includes two differential amplifiers 602-1 and 602-2. The outputs of diode detectors 600-1 through 600-4 are connected to the inputs of differential amplifier 602-1 through 602-2 in a manner such that each differential amplifier includes inputs offset by 90°. Specifically, the output of diode detector 600-1 is provided as an input to the positive input terminal while the output of diode detector 600-4 is provided to the negative input terminal of the differential amplifier 602-1. The output of diode detector 600-2 is provided as an input to the positive input terminal while the output of diode detector 600-3 is provided as an input to the negative input terminal of differential amplifier 602-2.

Alternatively, directional couplers or circulators may be utilized to detect the modulated RF signals. In one embodiment, detector 207 (FIG. 8) includes a double balanced mixer, the double balanced mixer receiving as inputs the interrogation signal and the radio frequency signal returned from the electronic tag, and providing an output signal representative of the identification information returned by the electronic tag. In another embodiment, detector 207 (FIG. 8) includes a directional coupler, a detector diode and a differential amplifier. In this configuration, the directional coupler is responsive to the interrogation signal and provides an output signal to a first input of the differential amplifier. The detector diode is responsive to the returned radio frequency signal provided by the electronic tag and provides an output signal to a second input of the differential amplifier. Finally, the differential amplifier provides an output signal representative of the identification information returned by the electronic tag.

Detector 207 has been described above in relationship to a two channel system. Specifically, two separate channels of data are provided to signal processor 208 (FIG. 8) associated with the data returning from electronic tag 18 (FIG. 3). Each channel is approximately 90° out of phase from the other. The two channel system was selected to eliminate the possibility of an interference condition arising at the receiver due to destructive interference of the transmitted interrogation signal and the electronic tag return signal. Alternatively, other channel configurations for detector 207 may be realized, depending on the performance required in the multi-meter terminal 100 (FIG. 3). Specifically, a single channel system may be implemented. While interference regions may arise, the overall complexity and power consumption for multi-meter terminal 100 (FIG. 3) will be reduced. In terms of operational performance, the interference regions may necessitate a user to reposition multi-meter terminal 100 (FIG. 3) in order to successfully read tag data.

The output of preamplifier 599 is coupled to signal processor 208 (FIG. 8). Signal processor 208 (FIG. 8) detects a frame marker associated with the beginning of a frame as well as decodes the identification information in the return signal provided by an associated electronic tag 18 (FIG. 3). In one embodiment, signal processor 208 (FIG. 8) detects frame information as well as decodes bit cycles of 20 kilohertz and 40 kilohertz cycle patterns generated from an electronic tag 18 (FIG. 3).

Figure 10:
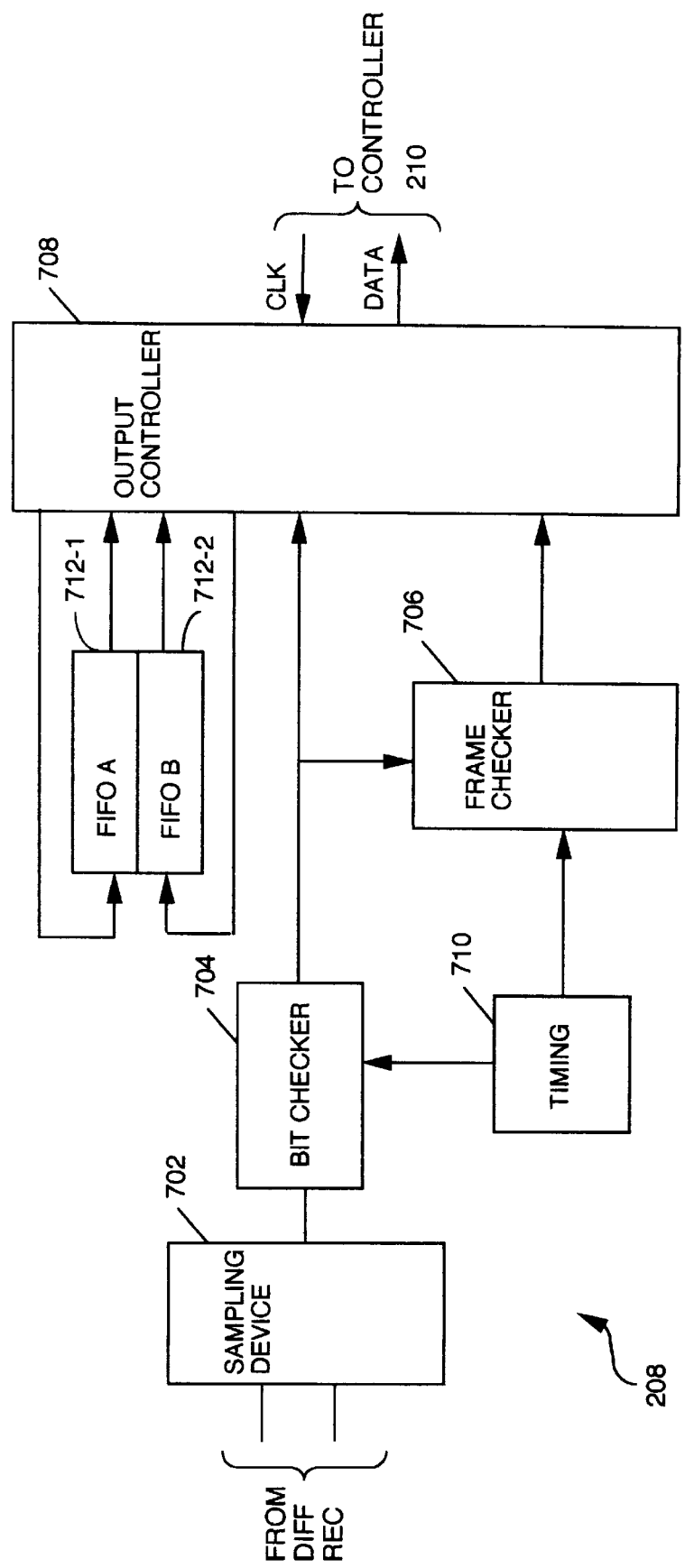
FIG. 10 is a schematic block diagram of a signal processor according to one embodiment of the present invention.

Referring to FIG. 10, a detailed view of signal processor 208 is shown, including sampling device 702, bit checker 704, frame checker 706, output controller 708, and timing element 710. Associated with output controller 708 are first and second first in-first out (FIFO) buffers 712-1 and 712-2. Sampling device 702 receives inputs from preamplifier 599 (FIG. 9) and samples the two channels looking for interference conditions in either. Sampling device 702 provides a single data stream input representative of the received data to bit checker 704.

Bit checker 704 determines the presence of a valid data bit. Specifically, bit checker 704 checks for predetermined sequences of 20 kilohertz and 40 kilohertz cycle signals associated with a valid "0" or "1" data bit (two 40 kilohertz cycles followed by a 20 kilohertz cycle for a "1", and one 20 kilohertz cycle followed by two 40 kilohertz cycles for a "0"). If the bit is valid, the bit is transferred to output controller 708. Frame checker 706 includes a register (not shown) for keeping track of the most recent data in order to identify the beginning of a new frame of data. In a preferred embodiment, frame checker 706 includes a FIFO (not shown) which is 128 bits in length for storing consecutive bits provided by bit checker 704. Frame checker 706 compares values stored in the FIFO for a match with a predetermined frame marker stored in a second register (not shown) in frame checker 706. Upon the identification of a valid frame marker, frame checker 706 outputs an interrupt to output controller 708, indicating that a valid frame marker been detected.

Output controller 708 receives the output bits generated by bit checker 704 and sequentially places each bit into a first one of FIFO buffers 712-1 and 712-2. Upon receipt of a valid frame marker interrupt from frame checker 706, output controller 708 begins a countdown associated with the completion of an entire frame of data. Output controller 708 continues to load data into a first one of the FIFO buffers 712-1 and 712-2 until a full frame has been transferred. At that time, output controller 708 generates an interrupt to controller 102 (FIG. 3) indicating that an entire frame of data has been received and is ready for processing. Thereafter, output controller 708 loads any new data received from bit checker 704 into a second one of FIFO buffers 712-1 and 712-2.

Accordingly, controller 102 (FIG. 3) must service the interrupt from output controller 708 prior to the second FIFO filling to assure no data will be lost. Upon receipt of a clock signal from controller 102 (FIG. 3), the contents of the first FIFO will be loaded to controller 102 (FIG. 3).

Figure 11:
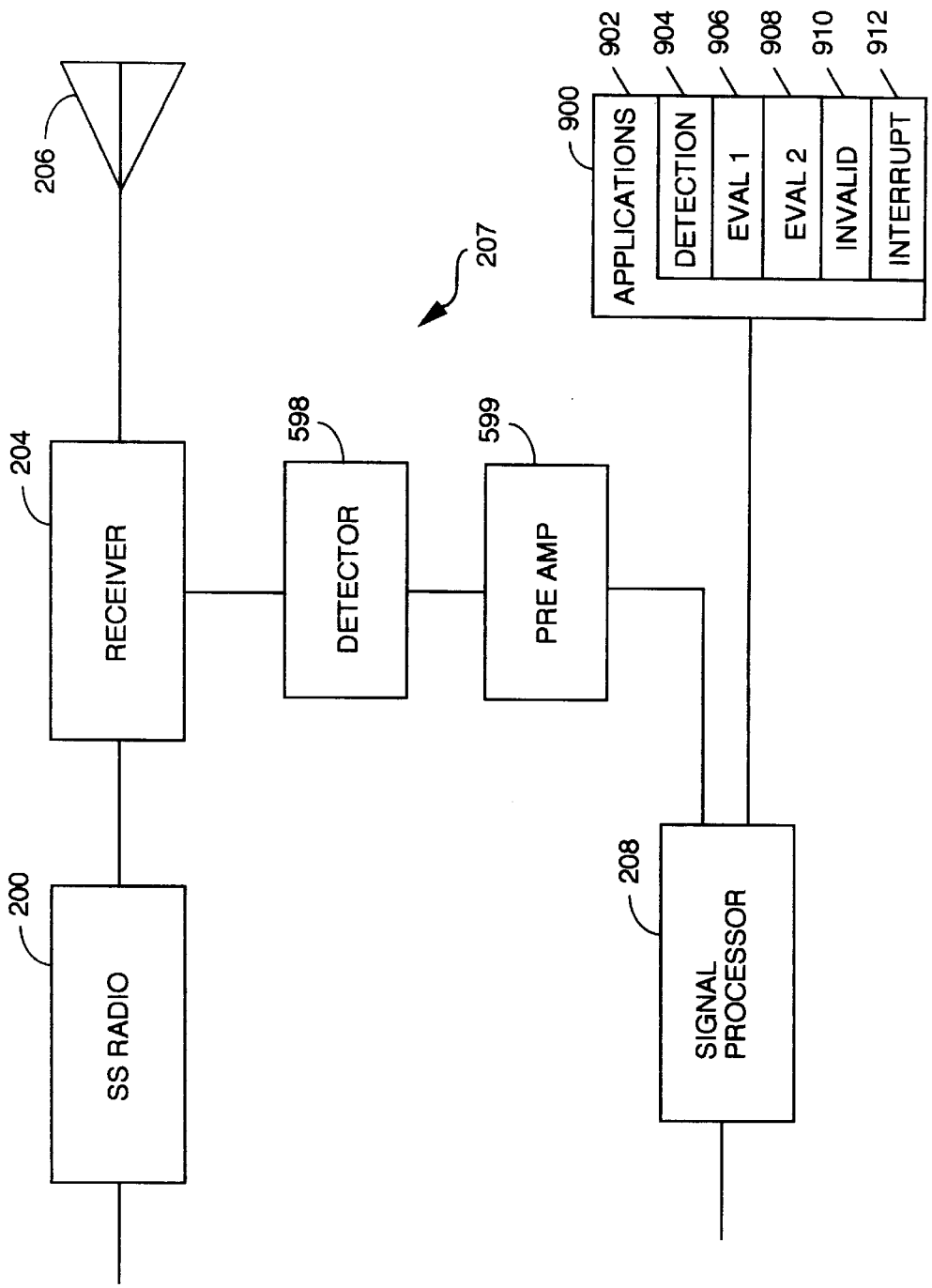
FIG. 11 is a schematic block diagram of the receive portion of a multi-meter terminal according to one embodiment of the present invention.

In one embodiment, the decoding and processing of received RF signals is performed in software as opposed to the hardware solution described above. Accordingly, signal processor 208 has associated with it a memory 900 for storing applications 902, as is shown in FIG. 11. Applications 902 include a detection routine 904, a first evaluation cycle 906, a second evaluation cycle 908, an invalid data routine 910, and an interrupt routine 912.

In one embodiment, the output from preamplifier 599 in each channel is processed simultaneously. Alternatively, a single channel of data may be processed, with the second channel of data stored in a FIFO buffer (not shown) for processing only in the event an interference condition arises. In either system, the basic processing of data is the same. Details associated with a two channel system having a primary and secondary data channel will be described below. The data collection for either the primary or secondary data channel is substantially the same, with any differences highlighted below. Specifically, a data stream associated with a channel in preamplifier 599 is coupled to signal processor 208 for decoding.

Figure 12:
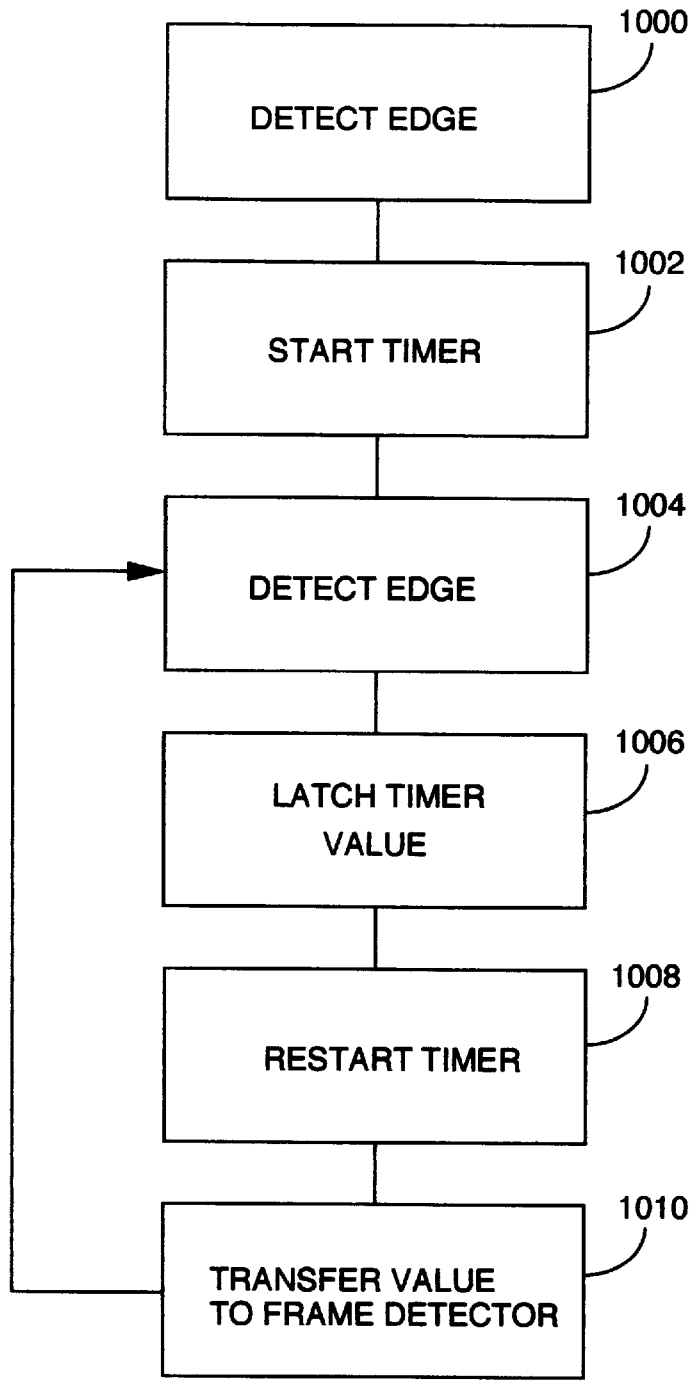
FIG. 12 is a flow diagram of a detection routine according to one embodiment of the present invention.

Referring to FIG. 12, a flow diagram associated with detection routine 904 is shown. Signal processor 208 (FIG. 11) receives a data signal for processing from preamplifier 599 (FIG. 11) and detects (1000) rising or falling edges in the signal. Both rising and falling edge detection is performed because the data received back from the electronic tag 18 (FIG. 3) may be inverted. Accordingly, detection of a rising or falling edge is required in order to identify the 20 and 40 kilohertz cycle signals.

After a first edge is detected, a first timer is started (1002). Upon the detection (1004) of a next edge, the value (cycle data) in the first timer is latched (1006) to a temporary storage buffer. The first timer is restarted (1008) and the cycle data indicative of the time between detected edge transitions is transferred (1010) to the bit checker 704 (FIG. 10). Upon the detection of the next edge, the value in the timer is latched for transfer to a frame detection routine. In this embodiment a single timer is used to facilitate the latching of data for transfer to an associated routine. Alternatively, two timers may be used.

Figure 13:
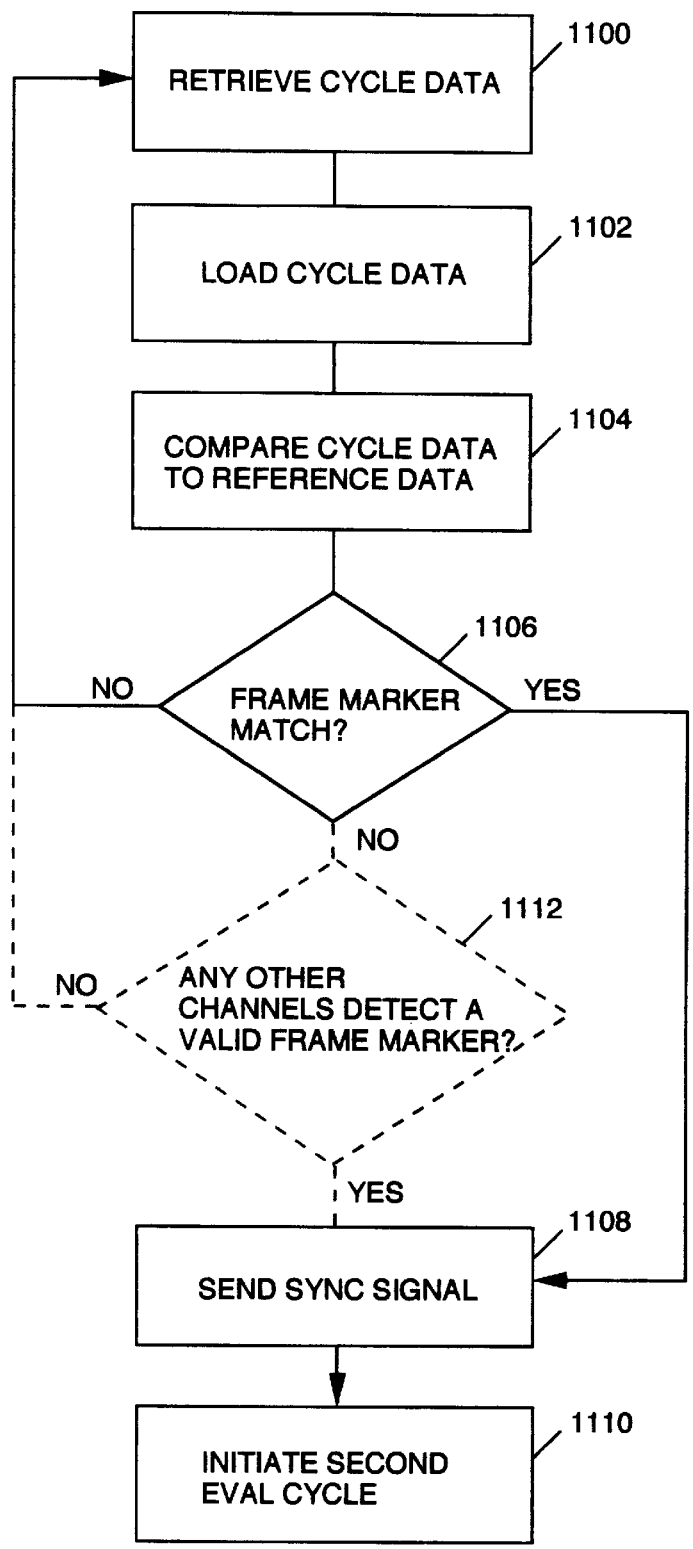
FIG. 13 is a flow diagram for a first evaluation cycle for detecting frame markers according to one embodiment of the present invention.

Referring to FIG. 13, a first evaluation cycle 906 commences upon the receipt of cycle data derived from detection routine 904 (FIG. 11). Specifically, cycle data is retrieved (1100) from detection routine 906 (FIG. 11). The cycle data is loaded (1102) into a FIFO buffer which contains a sequence of cycle data. The sequence of cycle data is compared (1104) to a reference data which is a predefined frame marker sequence. If no match is detected, then the process restarts upon the next cycle data input. If a frame marker match is detected (1106), then a second evaluation cycle 908 (FIG. 11) is initiated (1110).

In a multichannel signal processing system, an additional step of synchronizing the retrieval of data between channels is performed prior to beginning the second evaluation cycle 908 (FIG. 11). Specifically, a frame synchronization signal is sent (1108) to each of the other channel data processors to synchronize the start of a data frame across the channels in a multichannel system. In multichannel systems, where two or more data channels are processed simultaneously, if no frame marker match is detected at step (1106), then a check (1112) is made to determine if another channel has detected a frame marker match. Upon receipt of a frame marker match signal from a secondary channel, then a frame synchronization signal is transmitted (1108) to synchronize data collection in secondary channels, and the second evaluation cycle is initiated (1110).

Figure 14:
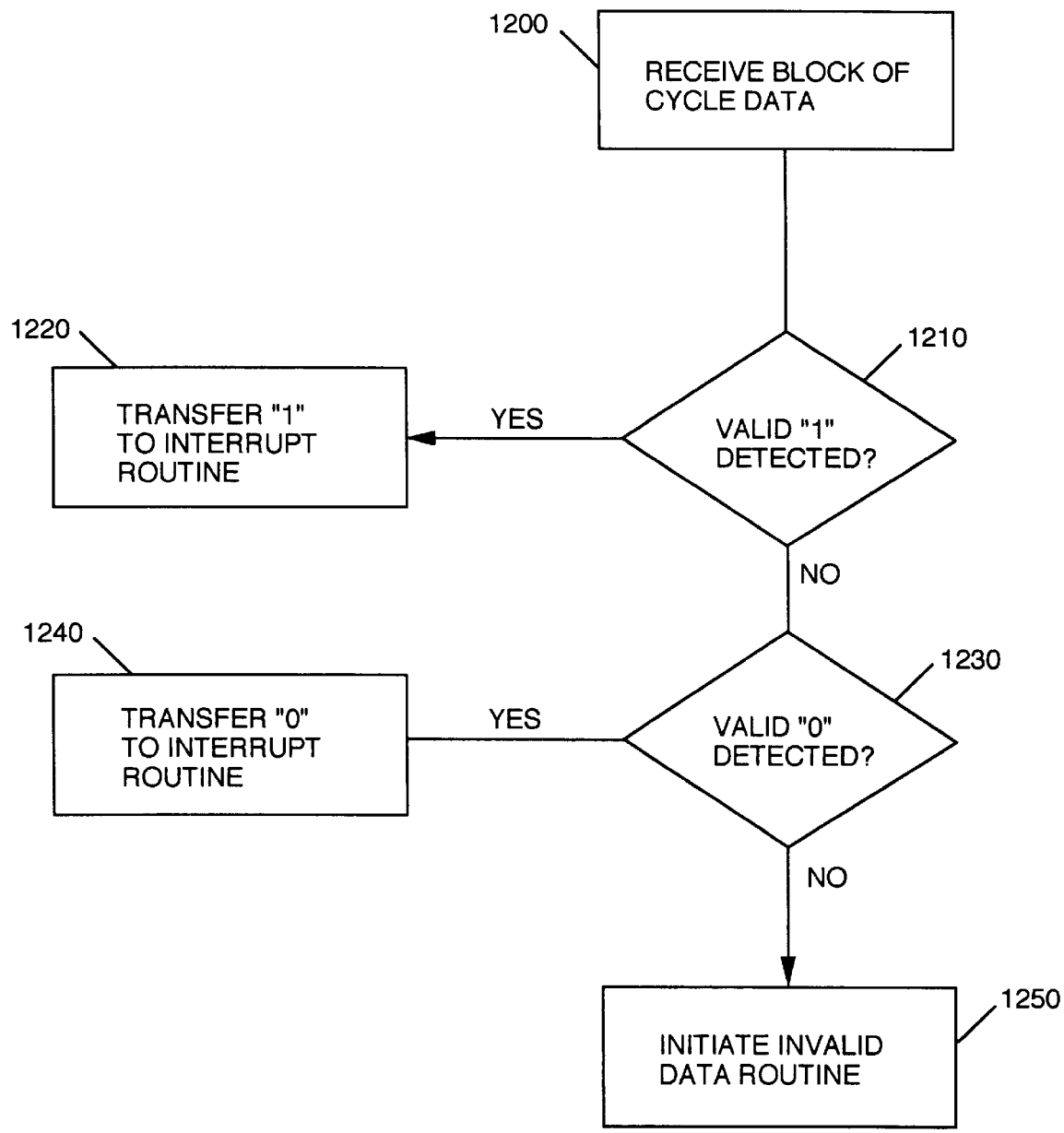
FIG. 14 is a flow diagram for a second evaluation cycle for detecting valid data bits according to one embodiment of the present invention.

Second evaluation cycle 908 (FIG. 11) decodes valid data bits from cycle data retrieved by detector routine 904 (FIG. 11). Referring to FIG. 14, after detection of a frame marker, blocks of three cycle data transfers are received (1200) and presented for evaluation to second evaluation cycle 908 (FIG. 11). A determination is made if the combination of the three cycle data transfers matches a predetermined sequence representative of a binary "1" or "0". Specifically, in one embodiment, a validity check (1210) is made if the three cycle data transfers correspond to two 40 kHz signals followed by a 20 kHz signal. If so, then a valid binary "1" data bit is transferred (1220) to the interrupt routine 912 (FIG. 11) for processing. If no match is detected, then a check (1230) is made if the three cycle data transfers correspond to one 20 kHz signals followed by two 40 kHz signals. If so, then a valid binary "0" data bit is transferred (1240) to interrupt routine 912 (FIG. 11) for processing. If no match is again detected, then invalid data routine 910 (FIG. 11) is initiated (1250). Each three cycle transfer block detected after a valid frame marker has been decoded is processed in this manner until the end of a frame of data is reached. Thereafter, the frame identification process, as described above in association with first evaluation cycle 904 (FIG. 11), is initiated searching for the beginning of the next frame of data for processing.

Referring to FIG. 11, in one embodiment of the present invention, the detection routine 904, first evaluation cycle 906, and second evaluation cycle 908 are executed simultaneously for each channel of data available for processing. However, only one data channel (primary data channel) provides a data stream to the interrupt routine 912 for processing. The secondary data channels temporarily store valid bits, for use in association with the invalid data routine 912 as discussed below, but are not required to transfer any data to interrupt routine 912.

Figure 15:
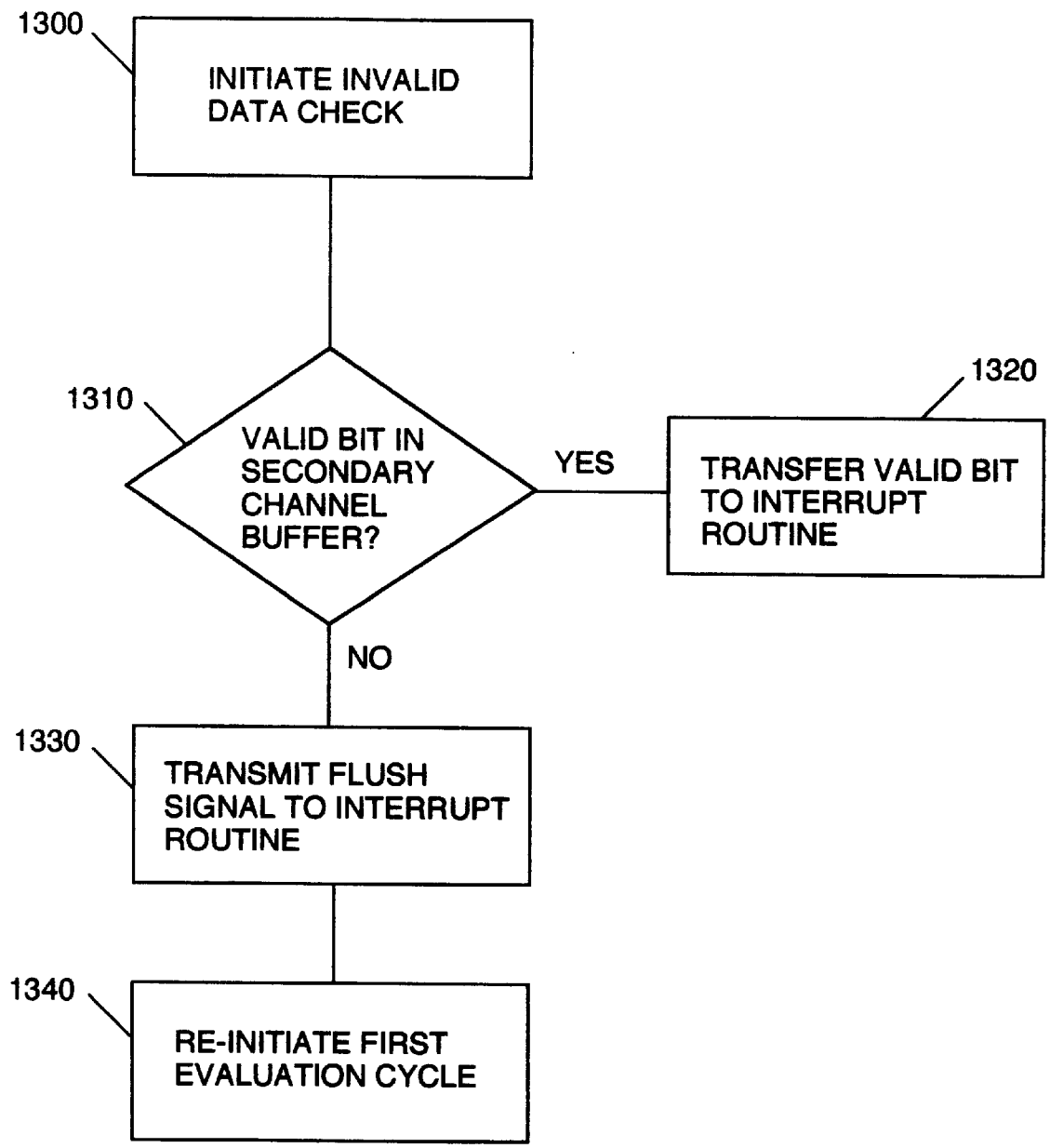
FIG. 15 is a flow diagram of a invalid bit routine for recovering from an interference condition in a primary data channel according to one embodiment of the present invention.

Referring to FIG. 15, the process associated with validating an invalid data bit detected in the middle of a frame in the primary data channel is shown. In a multichannel system, an interference condition may arise in the primary data channel due to the destructive interference of the interrogating RF signal generated by multi-meter terminal 100 (FIG. 3), and modulated RF signals returned by the electronic tag 18 (FIG. 3). Invalid bits detected as part of the second evaluation cycle 908 (FIG. 11) may reflect an interference condition and not the true state of the data returned from the electronic tag. Accordingly, upon the detection (1300) of an invalid bit of data, a check is made in one or more of the secondary data channels to determine if a valid binary "1" or "0" has been detected. This is accomplished by having each secondary data channel store a detected valid bit in a temporary buffer, until the next valid data bit has been detected. Accordingly, in one embodiment a single bit buffer is used to store this "duplicate" data derived in each of the secondary channels.

Specifically, a check (1310) is made of the single bit buffer in a secondary data channel to determine if a valid bit in the secondary channel buffer has been decoded. If a valid bit has been decoded, then the data value of the valid bit is transferred (1320) to interrupt routine 912 (FIG. 11) for further processing. Alternatively, if no valid bit has been detected in this secondary channel, then a flush signal is transmitted (1330) to interrupt routine 912 (FIG. 11) and the first evaluation cycle 906 (FIG. 11) is re-initiated (1340) to search for another valid frame marker. The details of the flush signal will be described in greater detail below in association with the interrupt routine 912 (FIG. 11).

For the purposes of this discussion, frame search is re-initialized upon the detection of a single invalid bit in a frame. Alternatively, re-initialization may occur after the occurrence of two or more invalid data bits depending on the performance requirements established for multi-meter terminal 100 (FIG. 3).

Figure 16:
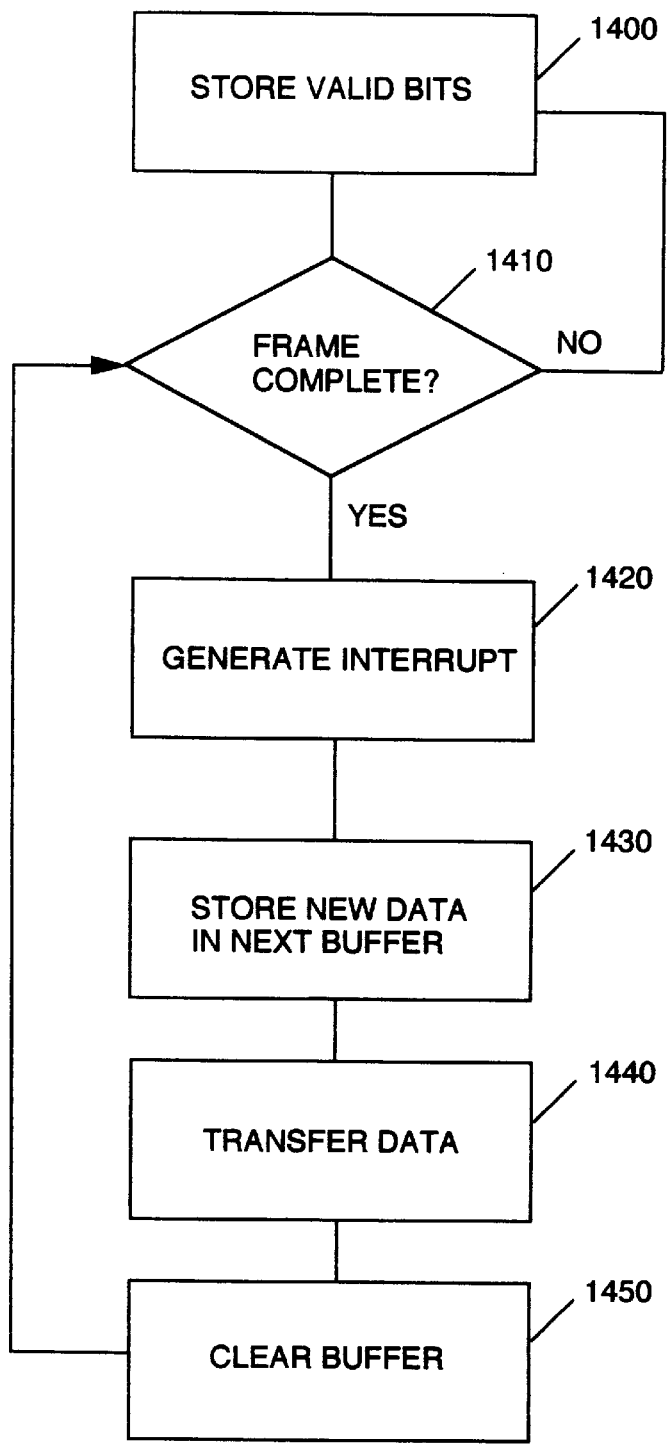
FIG. 16 is a flow diagram for an interrupt routine for transferring data from the signal processor to a controller in the multi-meter terminal according to one embodiment of the present invention.

Interrupt routine 912 (FIG. 11) temporarily stores valid data bits received and generates an interrupt for servicing by controller 102 (FIG. 3) upon decoding a complete frame of data. Referring to FIG. 16, each valid bit received from the primary data channel is stored (1400) in a temporary buffer. Upon the receipt of a new valid bit, a check (1410) is made to determine if the frame is complete. If the frame is complete, then an interrupt (1420) is generated and sent to controller 102 (FIG. 3), while any new valid data bits are stored (1430) in a second temporary buffer. Upon receipt of a clock signal from controller 102 (FIG. 3), the frame of data is transferred (1440) to controller 102 (FIG. 3). Thereafter, the temporary buffer is cleared (1450). In one embodiment, prior to checking to see if the temporary buffer is full (indicating a complete frame of data has been decoded) in step 1410, a check is made to see if a flush signal has been received. If so, then the temporary buffer is cleared. This process repeats, alternating storage in the pair of temporary buffers.

In one embodiment signal processor 208 (FIG. 3) is a separate processor as described above. Alternatively, signal processor may be incorporated into controller 102 (FIG. 3). In this alternative embodiment, associated applications 902 (FIG. 11) may be stored in a memory (not shown).

Figure 17:
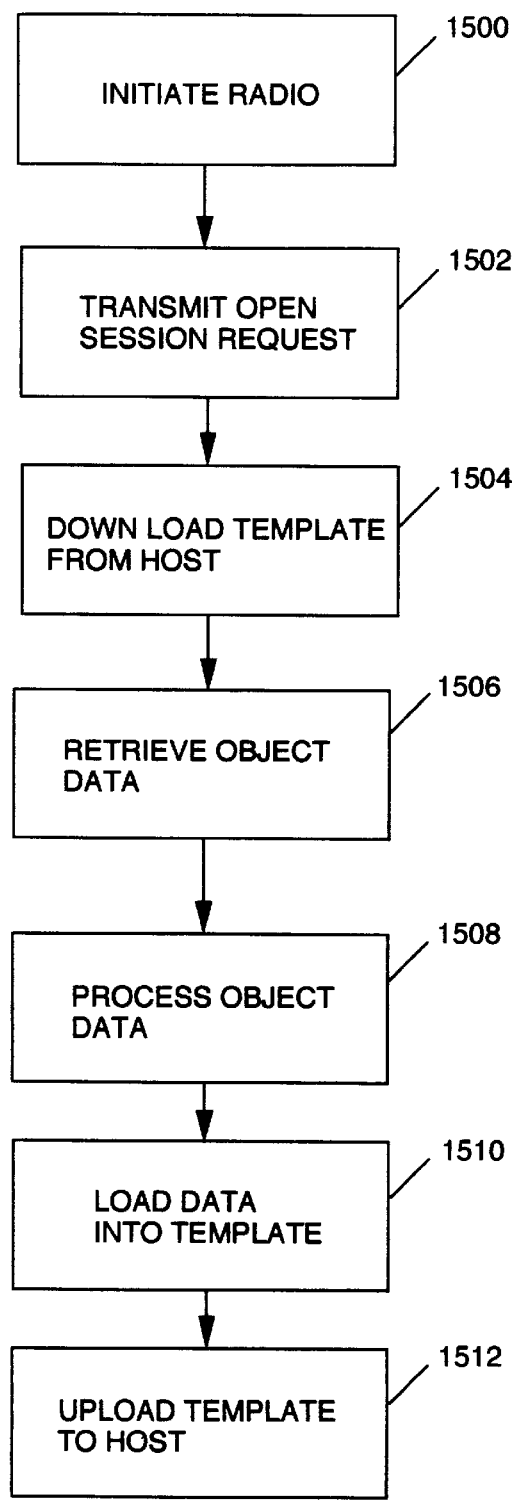
FIG. 17 is a flow chart of a data gathering process according to one embodiment of the present invention.

Referring to FIGS. 3 and 17, a method of identifying an object through processing object identification data begins by the retrieval of a transactional template by the multi-meter terminal 100. The transactional template includes instructions for loading data from the terminal back to the host and is related to the type of objects being identified. The transactional template may include instructions for the user on use of the multi-meter terminal, or instructions for the retrieval of particularized information for this communication session. Accordingly, the transactional template retrieved from host base station 232 may contain one or more screens for display in a predetermined order. Initial screens may be used to communicate instructions to the user, while later screens can be used to retrieve/store data. In one embodiment, a transactional template is received from the host on initiation (power on) of the multi-meter terminal.

At power on, multi-meter terminal 100 initiates the radio portion of the integrated RFDC and RFID module 110 (1500). Thereafter, a communication session is opened with a host by transmitting an open session request signal to an associated host via the radio portion of the integrated RFDC and RFID module 110 (1502). Upon receipt back from the host of an acknowledgment signal to the open session request, a transactional template is downloaded from the host (1504). Alternatively, the transactional template may be retrieved locally (stored in a memory at the multi-meter terminal) by a routine stored on the terminal. After retrieval, an initial virtual screen associated with the transactional template is displayed for the user. The multi-meter terminal is ready to retrieve object data.

Individual reader/data modules are controlled via a user activated trigger or may be activated by instructions received from the host in the transactional template. Some reader/data modules are strongly directional, and therefore are operated by the user (e.g., a bar code reader module). Alternatively, other reader/data modules can be operated without user operation (triggering) (e.g., a GPS module). In one embodiment of the present invention, a separate trigger is provided for each reader/data module.

Object data is retrieved by activating a trigger for a particular reader module (1506). Data is read by an associated module, and processed by controller 102 (1508). Data handler application stored in SRAM 152 is executed on CPU 150 to process the data retrieved from objects. Data processing includes determining the start and stop of streams, translation of function codes (block or character modes), formatting of received data and verification of data type (the data type is consistent with the data desired to be retrieved). For example, the processing of bar codes requires formatting the received bar code readings to include not only the raw data but also the type of bar code symbol. Other examples of data processing include assigning starting and ending bits defining blocks of data.

Thereafter, data associated with the object (in the form of RFID tag data, a bar code, or other data depending on the input module) is loaded into the transactional template and is displayed for the user (1510). The display of the retrieved data allows for feedback to the operator that a data read has been successful.

When a transactional template has been filled with data for transmission to host base station 232, then the RFDC portion of the integrated RFDC and RFID module performs an upload of the transaction results to the host (1512). Thereafter, a new transactional template may be down loaded from the host. In one embodiment of the invention, multiple templates may be down loaded from the host at initiation and stored in local memory. Upon each upload, the next template in the sequence of templates may be displayed to the user.

Figure 18:
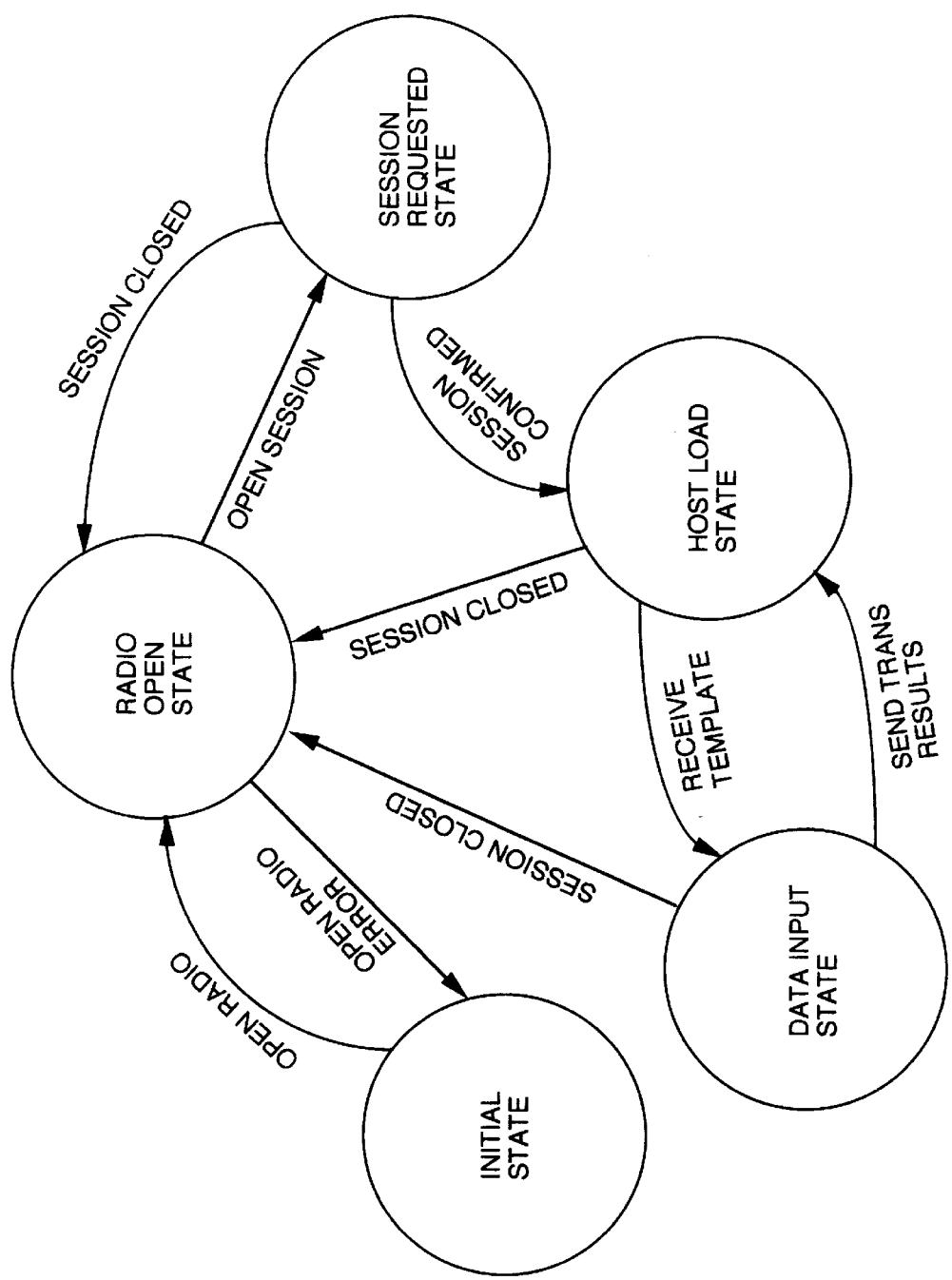
FIG. 18 is a state diagram associated with the controller according to one embodiment of the present invention.

Referring to FIGS. 3 and 18, a state machine describing the various states of controller 102 during object data retrieval is shown. The state machine includes five states: an initial state, a radio open state, a session requested state, a host load state and, finally, a data input state.

Upon the initiation of an object data recovery operation, the controller enters the INITIAL state. Thereafter, the controller 102 generates an open radio signal to the radio portion of the RFDC and RFID module and enters the RADIO OPEN state. The controller will return to the INITIAL state if it receives a open radio error signal back from the radio.

In the RADIO OPEN state, the radio in the RFDC portion of the integrated RFDC and RFID module is configured to communicate to a host base station. After the radio is configured, the controller issues a open session request signal which is transferred to a host base station. Upon the issuance of the open session request, the controller transitions to the SESSION REQUESTED state. In the event the radio receives a close session signal back from the host, the controller transitions back to the RADIO OPEN state.

When the controller receives back a session confirmation signal confirming the open session request to the host, the controller transitions to the HOST LOAD state.

In the HOST LOAD state, the controller processes whatever data is received, which includes receiving templates and displaying their associated virtual screens to a user, and receiving data to be loaded into the templates. In the event that a closed session command is received from the host, the controller transitions back to the RADIO OPEN state, and thereafter attempts to reconfirm an open session with the host. When a template load has been completed, then the controller transitions into the DATA INPUT state.

During the DATA INPUT state, the controller uploads a template to host base station 232 through the radio portion of the integrated RFDC and RFID module 110. The controller transitions back to the HOST LOAD state, and transfers a template page of data back to the host. The system will remain in the HOST LOAD state until it receives another template for processing or until the session with the host is complete.

After a radio session has been opened, a close session signal or other interruption by the host will result in the controller transitioning back to the RADIO OPEN state.

Figure 19:
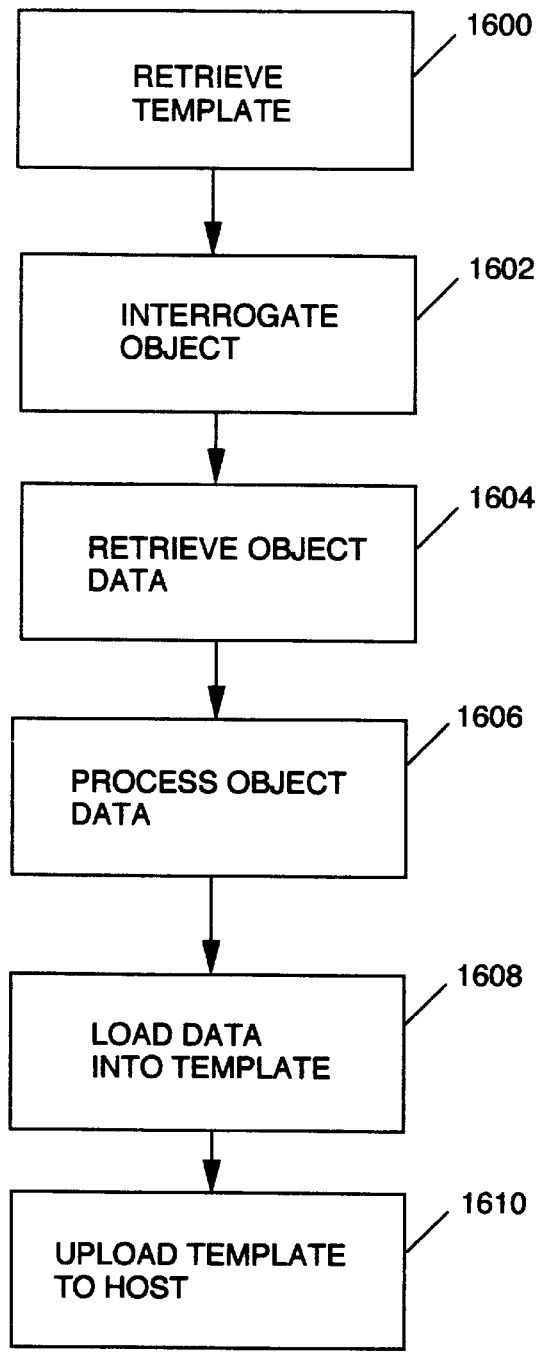
FIG. 19 is a flow chart of a data gathering process according to one embodiment of the present invention.

Referring to FIGS. 3 and 19, in a method for performing object identification according to the present invention, a virtual screen template associated with an object to be identified is retrieved and displayed for the operator (1600). The multi-meter terminal is triggered to initiate interrogation of a desired object (1602). If an RFID tag is to be read, the trigger generates the transmission of an interrogation signal by the radio. The trigger also decouples the spreader in the radio.

Thereafter the multi-meter terminal retrieves object data (1604). If the data is retrieved from an electronic tag, signal processor 208 processes the signal received back from the interrogated RFID tag device. The tag information associated with the particular device is extracted by signal processor 208 and sent to the controller 102 for processing (1606). Alternatively, bar code module data (or other reader/data module output) is sent to the controller for processing.

When the data is received by controller 102, the CPU 150 (FIG. 5) in the controller processes it and places it into a template (1608). When a template is full, the radio portion of the integrated RFDC and RFID module uploads the data to host base station 232 (1610).

Alternative Embodiments

In one embodiment of the invention, a prepackaged wireless LAN connection device is modified to generate interrogation signals and read modulated RF signals returned from an electronic tag, while maintaining the capability of transmitting and receiving information from a host computer through a single radio structure. Specifically, a WaveNet 3000 portable terminal, manufactured by WaveNet Technologies, Inc., is modified to include a receiver 204 (FIG. 3), detector 207 (FIG. 3), signal processor 208 (FIG. 3).

In one embodiment, a memory is associated with controller 102 (FIG. 3) which includes one or more routines for autonomous operation of the multi-meter terminal. The routines stored in the memory include display, storage, comparison and down-loading and uploading routines.

In one embodiment, a narrow band UHF-FM, a 902–928 MHZ spread spectrum, or a 2400–2500 MHZ spread spectrum radio is used. A base unit, part number WaveNet base station 7000, manufactured by WaveNet Technologies, Inc., may be used as a host base station for receipt of object data transmitted from the modified WaveNet 3000 terminal.

In another embodiment, radio 200 (FIG. 3) may be a frequency hopping spread spectrum radio, a direct sequence spread spectrum radio, narrow band UHF-FM radio or other radio as is known in the art.

The present invention has been described in terms of specific embodiments, which are illustrative of the invention and not to be construed as limiting. Other embodiments are within the scope of the following claims.

What is claimed is:

1. An apparatus for identifying objects including objects having electronic tags, the apparatus comprising;
    a plurality of data modules including an integrated radio module;
    a triggering device for initiating one of the data modules to retrieve object identification data from a selected object;
    the integrated radio module including a radio frequency source for generating a radio frequency signal, the integrated radio module operable to transmit the radio frequency signal to interrogate the selected object if the selected object includes an electronic tag, to combine the radio frequency signal with retrieved object identification data for the selected object producing a data signal, and to transmit the data signal including the retrieved object identification data to a remote host; and
    a housing containing the data modules, triggering device and the integrated radio module.

2. The apparatus of claim 1 wherein the data modules are selected from the group of a bar code reader, a scanner, a global positioning system module and a two way voice module.

3. The apparatus of claim 1 wherein the integrated radio module includes an RFID reader.

4. The apparatus of claim 3 wherein the RFID reader processes multiple tag protocols.

5. The apparatus of claim 3 wherein one of the plurality of data modules is a bar code reader.

6. The apparatus of claim 3 wherein one of the plurality of data modules is a text scanner.

7. The apparatus of claim 3 wherein one of the plurality of data modules is a 2D bar code scanner.

8. The apparatus of claim 3 wherein one of the plurality of data modules is a machine vision module.

9. The apparatus of claim 3 wherein one of the plurality of data modules is a GPS module.

10. The apparatus of claim 3 wherein one of the plurality of data modules is a voice recognition module.

11. The apparatus of claim 3 wherein one of the plurality of data modules is a two way voice recognition module.

12. The apparatus of claim 3 wherein one of the plurality of data modules is a printer.

13. The apparatus of claim 3 wherein one of the plurality of data modules is a proximity sensor.

14. The apparatus of claim 13 wherein the proximity sensor is a laser proximity sensor.

15. The apparatus of claim 13 wherein the proximity sensor is a ultrasonic proximity sensor.

16. The apparatus of claim 13 wherein the proximity sensor is a microwave proximity sensor.

17. The apparatus of claim 1, wherein the integrated radio module is coupled to the triggering device and the triggering device is responsive to a triggering signal received from the host through the integrated radio module.

18. The apparatus of claim 1 further including a user interface and wherein the triggering device is responsive to a triggering signal initiated by the user through the user interface.

19. The apparatus of claim 1 wherein the triggering device is responsive to a triggering signal generated by one of the plurality of data modules.

20. The apparatus of claim 1 wherein the triggering device is responsive to a triggering signal generated manually by a user.

21. The apparatus of claim 1 wherein the integrated radio module includes:

an antenna;

a transceiver for transmitting the radio frequency signal to the electronic tag through the antenna and for receiving a returned radio frequency signal from the electronic tag including encoded data;

a data handler for processing the returned radio frequency signal to decode the encoded data from the electronic tag; and a mixer for combining the decoded data and the radio frequency signal to produce the data signal for transmission by the transceiver to the remote host.

22. The apparatus of claim 21 wherein the antenna is a directional antenna.

23. The apparatus of claim 21 wherein the antenna includes an omnidirectional antenna, a directional antenna and means for coupling the transceiver to the omnidirectional antenna during uploading operations and coupling the directional antenna to the transceiver during tag reading operations.

24. The apparatus of claim 23 wherein the omnidirectional antenna is a whip antenna.

25. The apparatus of claim 1 wherein the integrated radio module includes a direct sequence spread spectrum radio.

26. The apparatus of claim 1 wherein the integrated radio module includes a frequency hopping spread spectrum radio.

27. The apparatus of claim 1 wherein the integrated radio module includes a narrow band radio.

28. The apparatus of claim 1 wherein the integrated radio module provides a link as part of a wireless wide area network to the host.

29. The apparatus of claim 1 wherein the integrated radio module provides a wireless link connected to a local area network for communication to the host.

30. The apparatus of claim 1 further including a user interface for receiving commands and a user display for displaying status information associated with read, uploading and downloading operations.

31. The apparatus of claim 30 wherein the user interface is a keyboard.

32. The apparatus of claim 30 wherein the user interface is a touch screen.

33. The apparatus of claim 30 wherein the user interface is a voice recognition system.

34. The apparatus of claim 1 wherein the housing is a hand-held portable design.

35. A method of identifying an object comprising the steps of:

retrieving a template associated with an object to be identified;

displaying the template for a user;

triggering one of one or more data modules for interrogating the object;

transmitting a radio frequency interrogation signal to the object if the object includes an electronic tag;

retrieving object identification data;

loading the object identification data into the template; and when the template is full, transmitting a data signal including the object identification data to a host, where the step of transmitting includes combining the object identification data with the radio frequency interrogation signal producing the data signal.

36. The method of claim 35 further including the step of receiving the template associated with an object to be identified from the host.

37. The method of claim 35 further including the steps of receiving commands and data from the host for controlling the retrieval and loading of object identification data from the object.

38. An object identification system comprising:

an object including object identification data; and a portable reader including a plurality of data modules including an integrated radio module;

a triggering device for initiating one of the plurality of data modules to retrieve object identification data from an object;

the integrated radio module including a radio frequency source for generating a radio frequency signal, the integrated radio module operable to transmit the radio frequency signal to interrogate the selected object if the selected object includes an electronic tag, to combine the radio frequency signal with retrieved object identification data for the selected object producing a data signal and to transmit the data signal including the retrieved object identification data to a remote host; and a portable housing containing the plurality of data modules, triggering device and the integrated radio module.

39. The object identification system of claim 38 wherein the object includes an electronic tag for storing the object data.

40. The object identification system of claim 39 wherein the electronic tag is a read/write tag.

41. The object identification system of claim 40 wherein the read/write tag receives data from the host.

42. The object identification system of claim 40 wherein the portable reader includes a user interface and where the read/write tag receives data from the user interface.

43. The object identification system of claim 38 wherein the integrated radio module:

an antenna;

a transceiver for transmitting the radio frequency signal to an electronic tag at the object through the antenna and for receiving a radio frequency signal returned from the electronic tag including encoded data;

means for processing the returned radio frequency signal to decode the encoded data from the electronic tag; and means for combining the decoded data and the radio frequency signal producing the data signal for transmission by the transceiver to the remote host.

44. A multi-meter terminal for identifying objects comprising:

a radio frequency module for generating an interrogation signal for transmission to objects having an electronic tag;

one or more reader modules for receiving identification data from an object;

a trigger device for initiating one of the one or more reader modules and radio frequency module to retrieve object identification data from a selected object; and a controller within the portable unit operable to gather identification data received from the selected object and combine the identification data with the interrogation signal from the radio frequency module for transmission to a base unit.

45. The multi-meter terminal of claim 44 wherein one of the one or more reader modules is an RFID reader and wherein the radio frequency module is integrated with the RFID reader module.

46. The multi-meter terminal of claim 45 wherein the integrated RFID reader and radio frequency module includes a transceiver capable both of reading identification information from electronic tags and transmitting collected information to a base unit for remote analysis.

47. The multi-meter terminal of claim 46 wherein the transceiver is used to receive information from a base unit and write data to read/write electronic tags.

48. The multi-meter terminal of claim 44 further including a user interface for initiating commands locally by a user and a user display for displaying status information associated with reading, downloading, or uploading processes.

49. The multi-meter terminal of claim 44 wherein the controller receives data and commands from the base unit for local processing and transfer to a read/write electronic tag.

50. The multi-meter terminal of claim 44 further including a portable housing for containing the one or more reader modules, trigger device, controller and the radio module.

* * * * *